United States Patent
Liu et al.

(10) Patent No.: US 10,644,308 B2
(45) Date of Patent: May 5, 2020

(54) ELECTRODE MATERIAL OF SODIUM-ION BATTERY, METHOD OF MANUFACTURING THE SAME AND ELECTRODE OF SODIUM-ION BATTERY

(71) Applicant: Chung Yuan Christian University, Taoyuan (TW)

(72) Inventors: Wei-Jen Liu, Taoyuan (TW); Yi-Tang Chiu, Taoyuan (TW); Rasu Muruganantham, Taoyuan (TW)

(73) Assignee: Chung Yuan Christian University, Taoyuan (TW)

( * ) Notice: Subject to any disclaimer, the term of this patent is extended or adjusted under 35 U.S.C. 154(b) by 53 days.

(21) Appl. No.: 15/942,582

(22) Filed: Apr. 2, 2018

(65) Prior Publication Data

US 2019/0148715 A1  May 16, 2019

(30) Foreign Application Priority Data

Nov. 10, 2017 (TW) .............................. 106139057 A

(51) Int. Cl.
| | |
|---|---|
| *H01M 4/1391* | (2010.01) |
| *H01M 4/136* | (2010.01) |
| *H01M 10/054* | (2010.01) |
| *H01M 4/131* | (2010.01) |
| *H01M 4/58* | (2010.01) |
| *H01M 4/1397* | (2010.01) |

(52) U.S. Cl.
CPC ......... *H01M 4/1391* (2013.01); *H01M 4/131* (2013.01); *H01M 4/136* (2013.01); *H01M 4/1397* (2013.01); *H01M 4/5825* (2013.01); *H01M 10/054* (2013.01)

(58) Field of Classification Search
None
See application file for complete search history.

(56) References Cited

U.S. PATENT DOCUMENTS

| | | | |
|---|---|---|---|
| 2011/0086266 | A1 | 4/2011 | Kondo |
| 2015/0132640 | A1 | 5/2015 | Balaya et al. |
| 2015/0147619 | A1 | 5/2015 | Chae et al. |

(Continued)

FOREIGN PATENT DOCUMENTS

| | | |
|---|---|---|
| CN | 102509789 | 6/2012 |
| CN | 103825004 | 5/2014 |
| CN | 105098179 | 11/2015 |

(Continued)

OTHER PUBLICATIONS

Dacek et al, Structure and Dynamics of Fluorophosphate Na-Ion Battery Cathodes, 10.1021/acs.chemmater.6b01989 Chem. Mater. 2016, 28, 5450-5460. (Year: 2016).*

(Continued)

*Primary Examiner* — Scott J. Chmielecki
(74) *Attorney, Agent, or Firm* — JCIPRNET

(57) ABSTRACT

An electrode material of a sodium-ion battery, a method of manufacturing the same, and an electrode of the sodium-ion battery are provided. The electrode material of the sodium-ion battery includes an oxide comprising sodium, vanadium, and phosphorus represented by formula 2 below:

$Na_{3+x2-y}V_2(PO_{4-y}F_y)_3$, wherein $0.01 \leq x2 \leq 0.99$ and $0.01 \leq y \leq 0.3$. [formula 2]

3 Claims, 14 Drawing Sheets

(56) References Cited

U.S. PATENT DOCUMENTS

2019/0312299 A1* 10/2019 Palani ............... H01M 10/0568

FOREIGN PATENT DOCUMENTS

| | | |
|---|---|---|
| CN | 105932277 | 9/2016 |
| CN | 106025226 | 10/2016 |
| CN | 106299248 | 1/2017 |
| TW | 201526365 | 7/2015 |

OTHER PUBLICATIONS

"Office Action of Taiwan Counterpart Application", dated Jul. 23, 2018, p. 1-p. 4.

"Office Action of China Counterpart Application," dated Dec. 30, 2019, p. 1-p. 6.

* cited by examiner

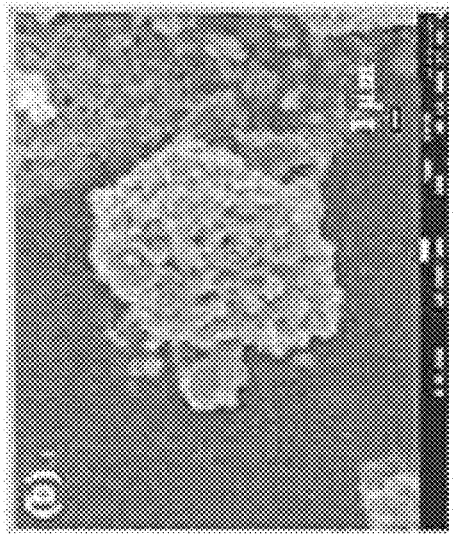
FIG. 10A
FIG. 10B
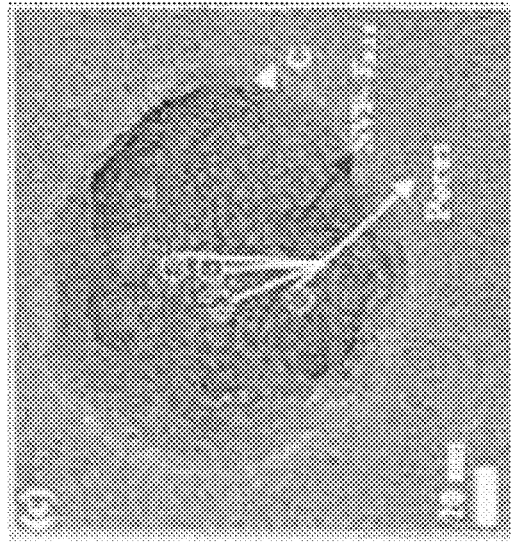
FIG. 10C
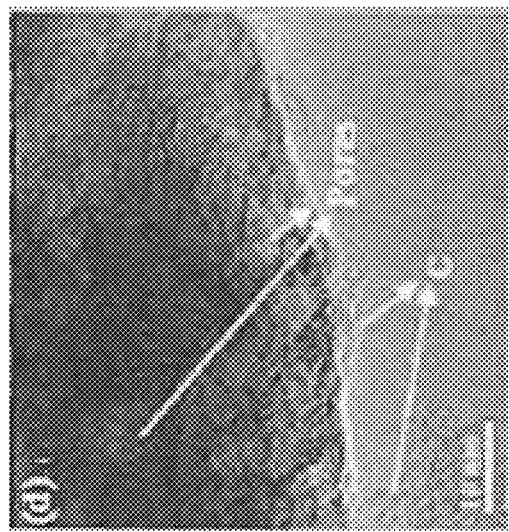
FIG. 10D

ELECTRODE MATERIAL OF SODIUM-ION BATTERY, METHOD OF MANUFACTURING THE SAME AND ELECTRODE OF SODIUM-ION BATTERY

CROSS-REFERENCE TO RELATED APPLICATION

This application claims the priority benefit of Taiwan application serial no. 106139057, filed on Nov. 10, 2017. The entirety of the above-mentioned patent application is hereby incorporated by reference herein and made a part of this specification.

BACKGROUND OF THE INVENTION

1. Field of the Invention

The invention relates to an electrode material of a battery, a method of manufacturing the same, and an electrode of a sodium-ion battery. More particularly, the invention relates to an electrode material of a sodium-ion battery, a method of manufacturing the same, and an electrode of the sodium-ion battery.

2. Description of Related Art

Comparing to the lithium-ion batteries, the sodium-ion batteries are relatively safe and eco-friendly and moreover, are equipped with other advantages such as rich sodium reserves, development of the sodium-ion batteries has thus gradually caught attention in recent years.

Nevertheless, the volume of the sodium-ion is 4.44 Å$^3$ (approximately 2.41 times of the volume of the lithium ion); as a result, when a sodium-ion battery is charged, volume of the sodium ion drastically changes (i.e., expansion and contraction) and it may easily lead to disintegration of the electrode structure of the sodium-ion battery when being charged. The cyclic life of the sodium-ion battery is decreased consequently. Further, the reduction potential of the sodium ion is less than the reduction potential of the lithium ion, as such, the energy density equipped by the sodium-ion battery is less than that equipped by the lithium-ion battery.

Therefore, a new electrode material used for the sodium-ion batteries is now urgently needed so as to overcome the foregoing problems.

SUMMARY OF THE INVENTION

The invention provides an electrode material of a sodium-ion battery, a method of manufacturing the same, and an electrode of the sodium-ion battery by which the sodium-ion battery is equipped with favorable cyclic life and increased electric properties.

The invention provides an electrode material of a sodium-ion battery, and the electrode material of the sodium-ion battery includes an oxide including sodium, vanadium, and phosphorus represented by formula 1 below:

$$Na_{x1}V_2(PO_4)_3, \qquad \text{[formula 1]}$$

wherein $3.01 \leq x1 \leq 3.99$.

In an embodiment of the invention, the x1 is, for example 3.10.

In an embodiment of the invention, the oxide including sodium, vanadium, and phosphorus may be doped with fluorine.

The invention provides an electrode material of a sodium-ion battery, and the electrode material of the sodium-ion battery includes an oxide including sodium, vanadium, and phosphorus represented by formula 2 below:

$$Na_{3+x2-y}V_2(PO_{4-y}F_y)_3, \qquad \text{[formula 2]}$$

wherein $0.01 \leq x2 \leq 0.99$ and $0.01 \leq y \leq 0.30$.

In an embodiment of the invention, the x2 is, for example, 0.25, and y is, for example, 0.15.

The invention also provides a method of manufacturing an electrode material of a sodium-ion battery which includes following steps. Sodium salt, vanadate, and phosphate are mixed with a first solvent to obtain a solution containing sodium, vanadium, and phosphorus. The first solvent in the solution containing sodium, vanadium, and phosphorus is removed to obtain a powder containing sodium, vanadium, and phosphorus. The powder containing sodium, vanadium, and phosphorus is sintered to obtain an aggregated powder containing an oxide including sodium, vanadium, and phosphorus. The aggregated powder containing the oxide comprising sodium, vanadium, and phosphorus is mixed with a second solvent to obtain a solution including the aggregated powder containing the oxide including sodium, vanadium, and phosphorus. The aggregated powder containing the oxide comprising sodium, vanadium, and phosphorus in the solution comprising the aggregated powder containing the oxide including sodium, vanadium, and phosphorus is dispersed to obtain a solution comprising a dispersed powder containing the oxide including sodium, vanadium, and phosphorus.

In an embodiment of the invention, the method further includes removing the second solvent in the solution comprising the dispersed powder containing the oxide including sodium, vanadium, and phosphorus to obtain the dispersed powder containing the oxide including sodium, vanadium, and phosphorus after dispersing the aggregated powder containing the oxide including sodium, vanadium, and phosphorus in the solution comprising the aggregated powder containing the oxide including sodium, vanadium, and phosphorus.

In an embodiment of the invention, an added mole ratio of the sodium salt to the vanadate to the phosphate is x1:2:3, wherein $3.01 \leq x1 \leq 3.99$.

In an embodiment of the invention, the method of manufacturing the electrode material of the sodium-ion battery further includes mixing salt containing fluorine with the sodium salt, the vanadate, the phosphate, and the first solvent, and an added mole ratio of the salt containing fluorine to the sodium salt to the vanadate to the phosphate is, for example, y:x1:2:3, wherein $3.01 \leq x1 \leq 3.99$ and $0.01 \leq y \leq 0.30$.

In an embodiment of the invention, the salt containing fluorine is, for example, sodium fluoride, ammonium fluoride, hydrogen fluoride, or a combination of the foregoing.

In an embodiment of the invention, the oxide including sodium, vanadium, and phosphorus is represented by, for example, formula 1 below:

$$Na_{x1}V_2(PO_4)_3, \text{ wherein } 3.01 \leq x2 \leq 3.99. \qquad \text{[formula 1]}$$

In an embodiment of the invention, the oxide including sodium, vanadium, and phosphorus is represented by, for example, formula 2 below:

$$Na_{3+x2-y}V_2(PO_{4-y}F_y)_3, \text{ wherein } 0.01 \leq x2 \leq 0.99 \text{ and } 0.01 \leq y \leq 0.3. \qquad \text{[formula 2]}$$

In an embodiment of the invention, the method of manufacturing the electrode material of the sodium-ion battery further includes adding citric acid, oxalic acid, gluconic acid, sucrose, salicylic acid, polyacrylic acid, or a combination of the foregoing acting as a carbon source in the solution containing sodium, vanadium, and phosphorus.

In an embodiment of the invention, the aggregated powder containing the oxide including sodium, vanadium, and phosphorus in the solution comprising the aggregated powder containing the oxide including sodium, vanadium, and phosphorus may be dispersed by using a sonicator.

In an embodiment of the invention, a time period for dispersing the aggregated powder containing the oxide including sodium, vanadium, and phosphorus in the solution comprising the aggregated powder containing the oxide including sodium, vanadium, and phosphorus by using the sonicator may be, for example, 3 minutes to 5 hours.

In an embodiment of the invention, the sodium salt is, for example, sodium carbonate ($Na_2CO_3$), sodium fluoride, or a combination of the foregoing.

In an embodiment of the invention, the vanadate is, for example, ammonium vanadate ($NH_4VO_4$), vanadium pentoxide, vanadium oxide, or a combination of the foregoing.

In an embodiment of the invention, the phosphate is, for example, ammonium dihydrogen phosphate ($NH_4H_2PO_4$), diammonium phosphate, or a combination of the foregoing.

In an embodiment of the invention, the first solvent and the second solvent are, for example, N-methyl-2-pyrrolidone (NMP), alcohol, acetone, water, or a combination of the foregoing.

The invention further provides an electrode of a sodium-ion battery which includes the oxide including sodium, vanadium, and phosphorus or the fluorine doped oxide including sodium, vanadium, and phosphorus, the adhesion promoter, the conducting agent, and the solvent.

To sum up, in the embodiments of the invention, when the oxide including sodium, vanadium, and phosphorus formed by changing added amount of sodium salt or performing fluorine doping acts as the electrode material of the sodium-ion battery, the sodium-ion battery is equipped with favorable cyclic life. In addition, the electrode material of the sodium-battery can also increase the electric properties of the sodium-ion battery. Further, in the method of manufacturing the electrode material of the sodium-ion battery, the aggregated powder in the solution containing the aggregated powder including the oxide including sodium, vanadium, and phosphorus is dispersed. Therefore, the oxide including sodium, vanadium, and phosphorus formed by sintering is thus not aggregated. The electric properties of the sodium-ion battery with the oxide including sodium, vanadium, and phosphorus acting as the electrode material increase as well.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 10A is a picture taken by the scanning electron microscope illustrating the oxide including sodium, vanadium, and phosphorus of the first comparative example; FIG. 10B is a picture taken by the scanning electron microscope illustrating the fluorine doped oxide including sodium, vanadium, and phosphorus of the second experimental example of the invention; FIG. 10C and FIG. 10D respectively are pictures taken by a high resolution transmission electron microscope (HR-TEM) of low magnification and high magnification illustrating the fluorine doped oxide including sodium, vanadium, and phosphorus of the second experimental example of the invention.

DESCRIPTION OF THE EMBODIMENTS

Reference will now be made in detail to the present specific embodiments of the invention, examples of which are illustrated in the accompanying drawings. However, the invention may be implemented in different forms rather than being limited by the embodiments described in the invention. To be specific, the following embodiments are provided such that the invention will be clear and complete and will fully convey the scope of the invention to those skilled in the art.

In the embodiments, the term "sodium, vanadium, and phosphorus" refers to a substance in which sodium, vanadium, and phosphorus are all included. For instance, an "oxide including sodium, vanadium, and phosphorus" refers to an oxide including all three of sodium, vanadium, and phosphorus.

Figure 1:
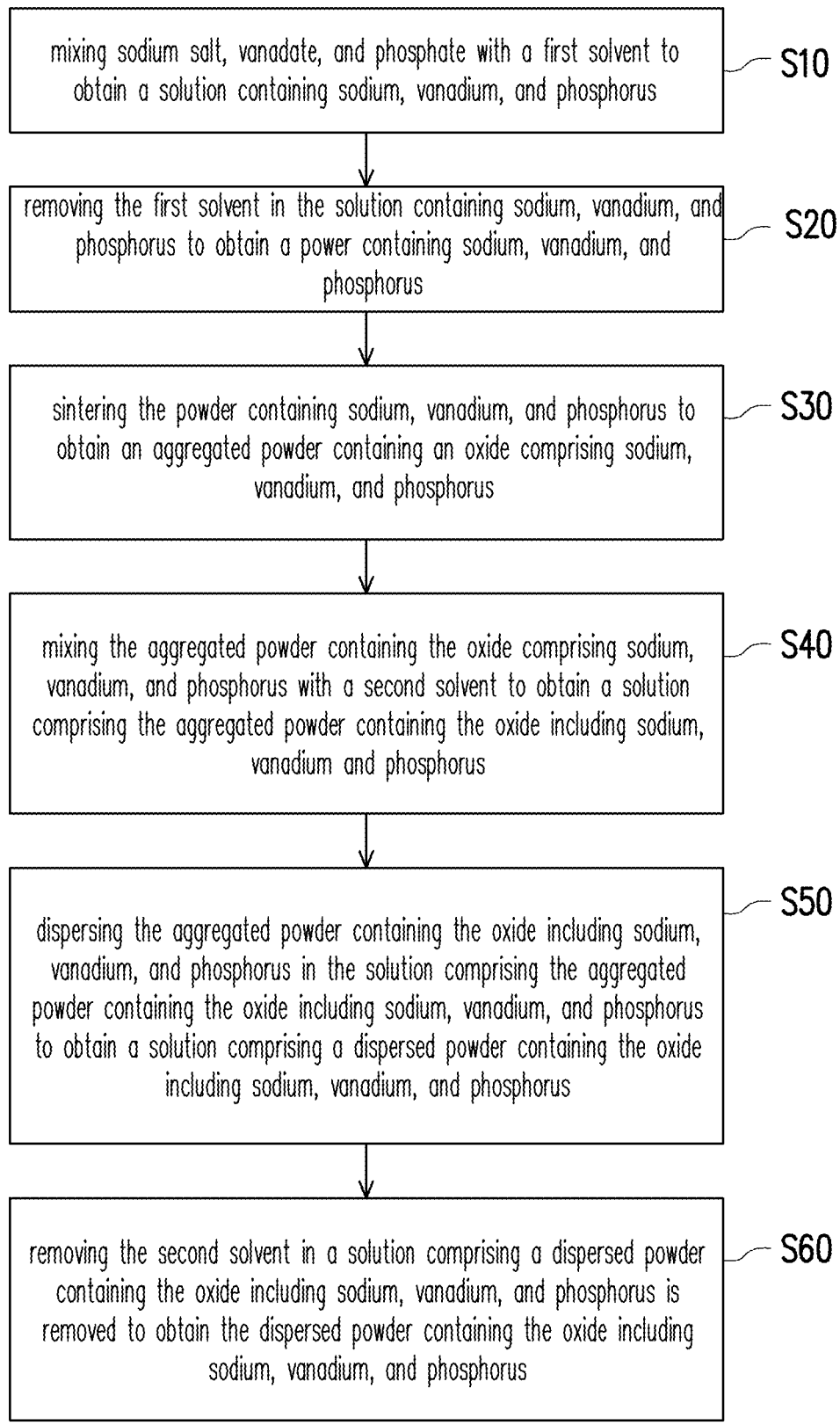
FIG. 1 is a flowchart illustrating a method of manufacturing an electrode material of sodium-ion battery according to an embodiment of the invention.

FIG. 1 is a flowchart illustrating a method of manufacturing an electrode material of sodium-ion battery according to an embodiment of the invention.

With reference to FIG. 1, step S10 is performed, and sodium salt, vanadate, and phosphate are mixed with a first solvent to obtain a solution containing sodium, vanadium, and phosphorus. The sodium salt is, for example, sodium carbonate, sodium fluoride, or a combination of the foregoing. The vanadate is, for example, ammonium vanadate, vanadium pentoxide, vanadium oxide, or a combination of the foregoing. The phosphate is, for example, ammonium dihydrogen phosphate, diammonium phosphate, or a combination of the foregoing. The first solvent is, for example, N-methyl-2-pyrrolidone, alcohol, acetone, water, or a combination of the foregoing. For instance, the sodium salt may be sodium carbonate, the vanadate may be ammonium vanadate, the phosphate may be ammonium dihydrogen phosphate, and the first solvent may be N-methyl-2-pyrrolidone. An added mole ratio of the sodium salt to the vanadate to the phosphate is x1:2:3, and $3.01 \leq x1 \leq 3.99$. In an embodiment, x1 may be 3.10. A solution containing sodium, vanadium, and phosphorus has a weight percentage concentration of, for example, 0.5% to 99%. In an embodiment, the solution containing sodium, vanadium, and phosphorus has a weight percentage concentration of, for example, 3.73%.

In addition, the solution containing sodium, vanadium, and phosphorus can be formed by a sol-gel method, a hydrothermal synthesis method, a solid-state reaction method, a high-energy ball mill method, a co-precipitation method, or a combination of the foregoing. In an embodiment, the sol-gel method may be selected to form the solution containing sodium, vanadium, and phosphorus. A reaction temperature of forming the solution containing sodium, vanadium, and phosphorus is, for example, 40° C. to 200° C., and a reaction time period of forming the solution containing sodium, vanadium, and phosphorus is, for example, 10 minutes to 1 day. In an embodiment, the reaction temperature of forming the solution containing sodium, vanadium, and phosphorus may be 80° C., and the reaction time period of forming the solution containing sodium, vanadium, and phosphorus may be 3 hours. In addition, in step S10, citric acid, oxalic acid, gluconic acid, sucrose, salicylic acid, polyacrylic acid, or a combination of the foregoing acting as a carbon source can further be added in the solution containing sodium, vanadium, and phosphorus. In an embodiment, the citric acid can be added to act as the carbon source in step S10.

In another embodiment, when manufacturing the electrode material containing a fluorine doped oxide including sodium, vanadium, and phosphorus, salt containing fluorine can be mixed together with sodium salt, vanadate, phosphate, and the first solvent, so as to obtain a fluorine doped solution containing sodium, vanadium, and phosphorus. The salt containing fluorine is, for example, sodium fluoride, ammonium fluoride, hydrogen fluoride, or a combination of the foregoing.

For instance, the salt containing fluorine may be sodium fluoride, the sodium salt may be sodium carbonate, the vanadate may be ammonium vanadate, the phosphate may be ammonium dihydrogen phosphate, and the first solvent may be N-methyl-2-pyrrolidone. An added mole ratio of the salt containing fluorine to the sodium salt to the vanadate to the phosphate is y:x1:2:3, $3.01 \leq x1 \leq 3.99$, and $0.01 \leq y \leq 0.30$. In an embodiment, x1 is 3.10 and y is 0.15. In addition, conditions recorded of a reaction temperature, a reaction time period, and an additive acting as the carbon source of the fluorine doped solution containing sodium, vanadium, and phosphorus are similar to those of the solution containing sodium, vanadium, and phosphorus, and that detailed descriptions are not further provided hereinafter.

Step S20 is performed, the first solvent in the solution containing sodium, vanadium, and phosphorus is removed to obtain a powder containing sodium, vanadium, and phosphorus. A method of removing the first solvent in the solution containing sodium, vanadium, and phosphorus includes drying the solution containing sodium, vanadium, and phosphorus. For instance, the solution containing sodium, vanadium, and phosphorus may be dried through a drying oven. A temperature used to dry the solution containing sodium, vanadium, and phosphorus through the drying oven may be 25° C. to 150° C. (e.g., 80° C.). A time period required for drying the solution containing sodium, vanadium, and phosphorus may be 1 minute to 3 days (e.g., 8 hours).

Step S30 is performed, and the powder containing sodium, vanadium, and phosphorus is sintered to obtain an aggregated powder containing the oxide including sodium, vanadium, and phosphorus. Sintering the powder containing sodium, vanadium, and phosphorus is performed, for example, in two stages (i.e., a first stage of sintering and a second stage of sintering). After the first stage of sintering is completed, the powder containing the oxide including sodium, vanadium, and phosphorus obtained can be subjected to grinding or the like and thus is less likely to be aggregated after the second stage of sintering is completed. In the first stage of sintering, a sintering temperature is, for example, 25° C. to 600° C. (e.g., 350° C.), and a time period for sintering is, for example, 30 minutes to 8 hours (e.g., 4 hours). In the second stage of sintering, a sintering temperature is, for example, 650° C. to 850° C. (e.g., 800° C.), and a time period for sintering is, for example, 2 hours to 48 hours (e.g., 8 hours). When the temperatures and the time periods used for the powder containing sodium, vanadium, and phosphorus respectively fall within the foregoing ranges, an aggregated powder containing the oxide including sodium, vanadium, and phosphorus of high quality is obtained.

Step S40 is performed, and the aggregated powder containing the oxide including sodium, vanadium, and phosphorus is mixed with a second solvent to obtain a solution including the aggregated powder containing the oxide including sodium, vanadium, and phosphorus. The second solvent is, for example, N-methyl-2-pyrrolidone, alcohol, acetone, water, or a combination of the foregoing. In an embodiment, the second solvent is N-methyl-2-pyrrolidone.

Step S50 is performed, and the aggregated powder containing the oxide including sodium, vanadium, and phosphorus in the solution comprising the aggregated powder containing the oxide including sodium, vanadium, and phosphorus is dispersed to obtain a solution comprising a dispersed powder containing the oxide including sodium, vanadium, and phosphorus. The aggregated powder containing the oxide including sodium, vanadium, and phosphorus in the solution comprising the aggregated powder containing the oxide including sodium, vanadium, and phosphorus may be dispersed through a sonicator. The sonicator is, for example, a box type sonicator or an input type sonicator. In an embodiment, the box type sonicator may be adopted to act as the sonicator. A time period for dispersing the aggregated powder containing the oxide including sodium, vanadium, and phosphorus in the solution comprising the aggregated powder containing the oxide including sodium, vanadium, and phosphorus by using the sonicator may be 3 minutes to 5 hours, e.g., 30 minutes. When the time period for dispersing the aggregated powder containing the oxide including sodium, vanadium, and phosphorus in the solution comprising the aggregated powder containing the oxide including sodium, vanadium, and phosphorus falls within the foregoing range, the aggregated powder containing the oxide including sodium, vanadium, and phosphorus in the solution comprising the aggregated powder containing the oxide including sodium, vanadium, and phosphorus is ensured to substantially be dispersed and is not presented in an aggregated form.

Step S60 may be selectively performed, and the second solvent in a solution including a dispersed powder containing the oxide including sodium, vanadium, and phosphorus is removed to obtain the dispersed powder containing the oxide including sodium, vanadium, and phosphorus. A method of removing the second solvent in the solution including the dispersed powder containing the oxide including sodium, vanadium, and phosphorus includes filtering and drying the solution including the dispersed powder containing the oxide including sodium, vanadium, and phosphorus. A method of filtering the solution including the dispersed powder containing the oxide including sodium, vanadium, and phosphorus includes, for example, suction filtration. The solution including the dispersed powder containing the oxide including sodium, vanadium, and phosphorus may be dried through the drying oven. A temperature for drying the solution including the dispersed powder containing the oxide including sodium, vanadium, and phosphorus by using the drying oven is, for example, 25° C. to 200° C. (e.g., 80° C.), and a time period for drying the solution including the dispersed powder containing the oxide including sodium, vanadium, and phosphorus is, for example, 1 minute to 3 days (e.g., 8 hours).

In an embodiment, the oxide including sodium, vanadium, and phosphorus represented by formula 1 may be manufactured through the method of manufacturing the electrode material of the sodium-ion battery of FIG. 1, and the oxide including sodium, vanadium, and phosphorus represented by formula 1 may act as an anode material or a cathode material of the battery.

$$Na_{x1}V_2(PO_4)_3 \quad \text{[formula 1]}$$

In formula 1, x1 is in a range of: $3.01 \leq x1 \leq 3.99$. In an embodiment, x1 may be 3.10.

In another embodiment, a fluorine doped oxide including sodium, vanadium, and phosphorus represented by formula 2 may be manufactured through the method of manufacturing the electrode material of the sodium-ion battery of FIG. 1, and the fluorine doped oxide including sodium, vanadium, and phosphorus represented by formula 2 may act as the cathode material of the battery.

$$Na_{3+x2-y}V_2(PO_{4-y}F_y)_3 \quad \text{[formula 2]}$$

In formula 2, x2 is in a range of: $0.01 \leq x2 \leq 0.99$, and y is in a range of: $0.01 \leq y \leq 0.30$. In an embodiment, x2 may be 0.25 and y may be 0.15.

Electrodes of a sodium-ion full battery (an anode and/or a cathode) may include the oxide including sodium, vanadium, and phosphorus represented by formula 1, an adhesion promoter, a conducting agent, and a solvent. In another embodiment, the electrodes of the sodium-ion full battery (the anode and/or the cathode) may include the fluorine doped oxide including sodium, vanadium, and phosphorus represented by formula 2, the adhesion promoter, the conducting agent, and the solvent. The adhesion promoter may be, for example, polyvinylidene difluoride (PVDF). The conducting agent may be, for example, Super-P carbon black. The solvent may be the N-methyl-2-pyrrolidone.

Figure 2:
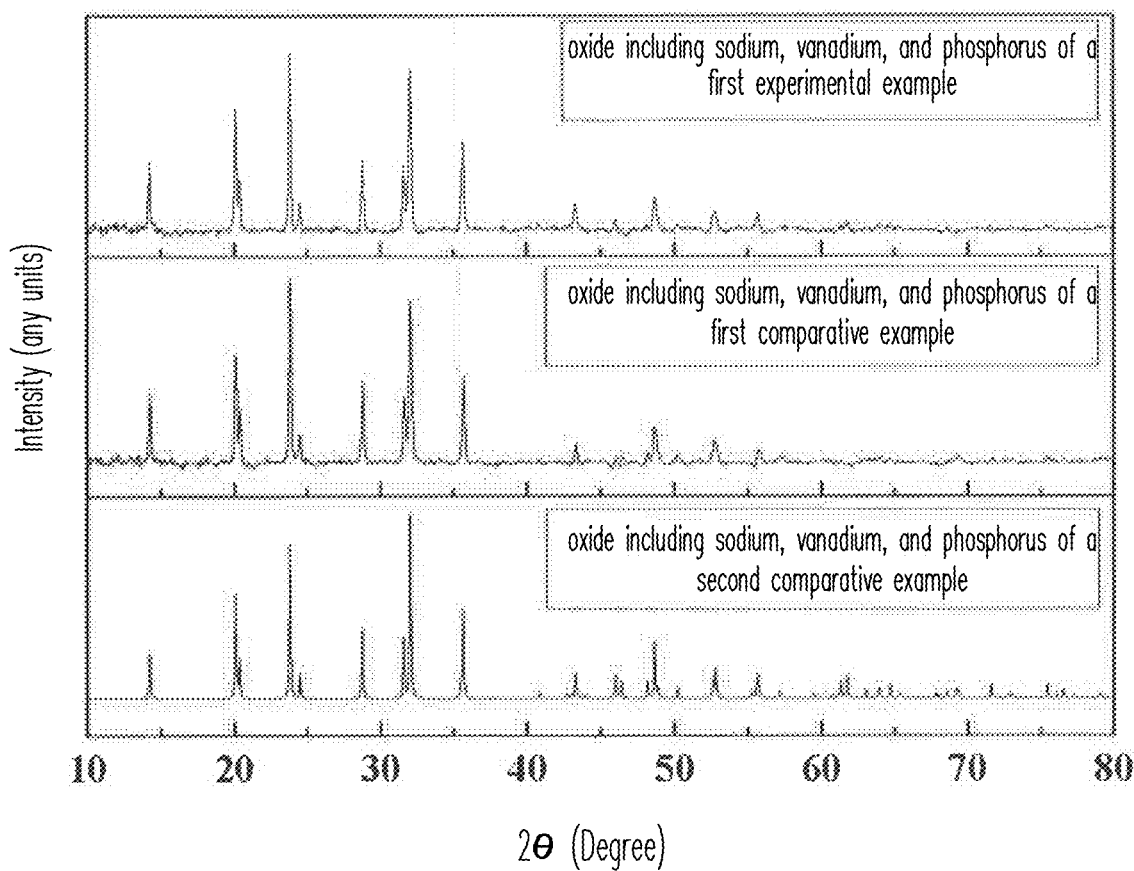
FIG. 2 is a graph illustrating X-ray diffraction patterns of an oxide including sodium, vanadium, and phosphorus of a first experimental example, an oxide including sodium, vanadium, and phosphorus of a first comparative example, and an oxide including sodium, vanadium, and phosphorus of a second comparative example of the invention.

FIG. 2 is a graph illustrating X-ray diffraction patterns of an oxide including sodium, vanadium, and phosphorus of a first experimental example, an oxide including sodium, vanadium, and phosphorus of a first comparative example, and an oxide including sodium, vanadium, and phosphorus of a second comparative example of the invention.

With reference to FIG. 2, after the oxide including sodium, vanadium, and phosphorus is formed according to the first experimental example of the invention, X-ray diffraction analyses may respectively be performed to the oxide including sodium, vanadium, and phosphorus (with a chemical formula of $Na_{3.1}V_2(PO_4)_3$, wherein when the oxide including sodium, vanadium, and phosphorus of the first experimental example is prepared, an added mole ratio of sodium carbonate to ammonium vanadate to ammonium dihydrogen phosphate to citric acid is 3.1:2:3:1.5) of the first experimental example, the oxide including sodium, vanadium, and phosphorus (with a chemical formula of $Na_3V_2(PO_4)_3$, wherein when the oxide including sodium, vanadium, and phosphorus of the first comparative example is prepared, the added mole ratio of sodium carbonate to ammonium vanadate to ammonium dihydrogen phosphate to citric acid is 3:2:3:1.5) of the first comparative example, and the oxide including sodium, vanadium, and phosphorus (with a chemical formula of $Na_3V_2(PO_4)_3$ and with a ICSD card number of the X-ray diffraction pattern of NO:248140) of the second comparative example. A purpose of performing the X-ray diffraction analyses to the foregoing substances is to ensure that a constituent of the oxide including sodium, vanadium, and phosphorus of the first experimental example is identical to constituents of the oxides including sodium, vanadium, and phosphorus of the first comparative example and the second comparative example, and no impurity is included.

Figure 3:
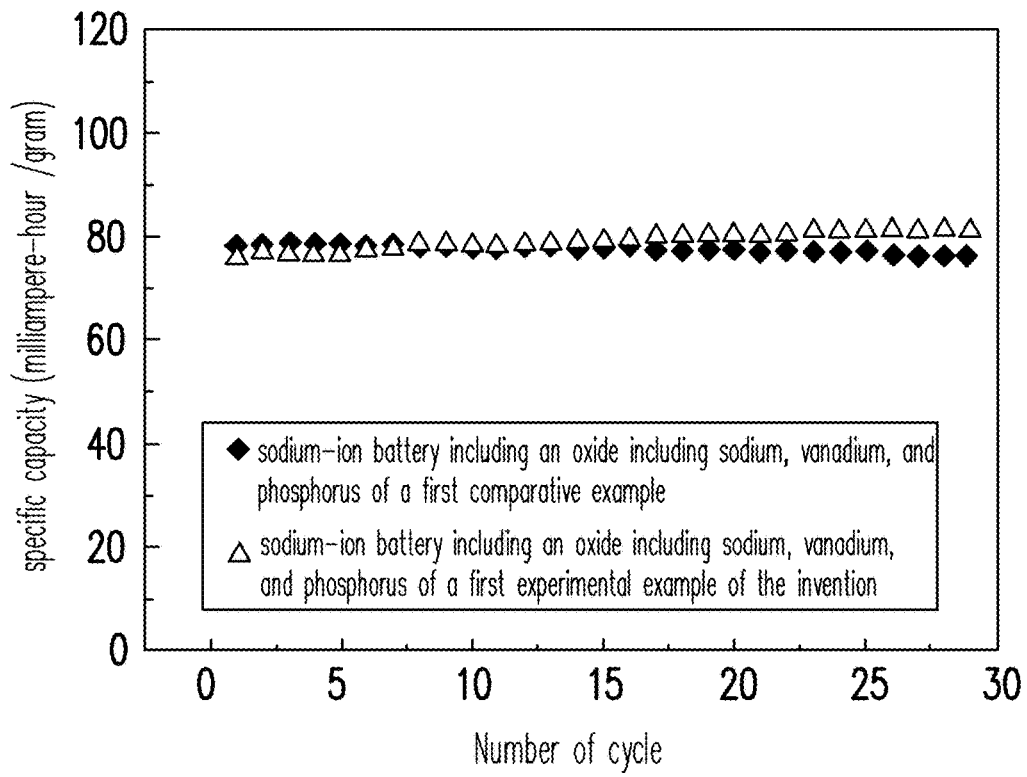
FIG. 3 is a curve graph illustrating changes of specific capacities of sodium-ion batteries respectively including the oxide including sodium, vanadium, and phosphorus of the first experimental example and the oxide including sodium, vanadium, and phosphorus of the first comparative example of the invention along with different numbers of cycle.

FIG. 3 is a curve graph illustrating changes of specific capacities of sodium-ion batteries respectively including the oxide including sodium, vanadium, and phosphorus of the first experimental example of the invention and the oxide including sodium, vanadium, and phosphorus of the first comparative example along with different numbers of cycle.

It can be seen in FIG. 3 that when a current density is 0.1 A/g and the number of cycle of the battery is greater than 6, the specific capacity of the sodium-ion battery including the oxide including sodium, vanadium, and phosphorus of the first experimental example is greater than the specific capacity of the sodium-ion battery including the oxide including sodium, vanadium, and phosphorus of the first comparative example.

Figure 4:
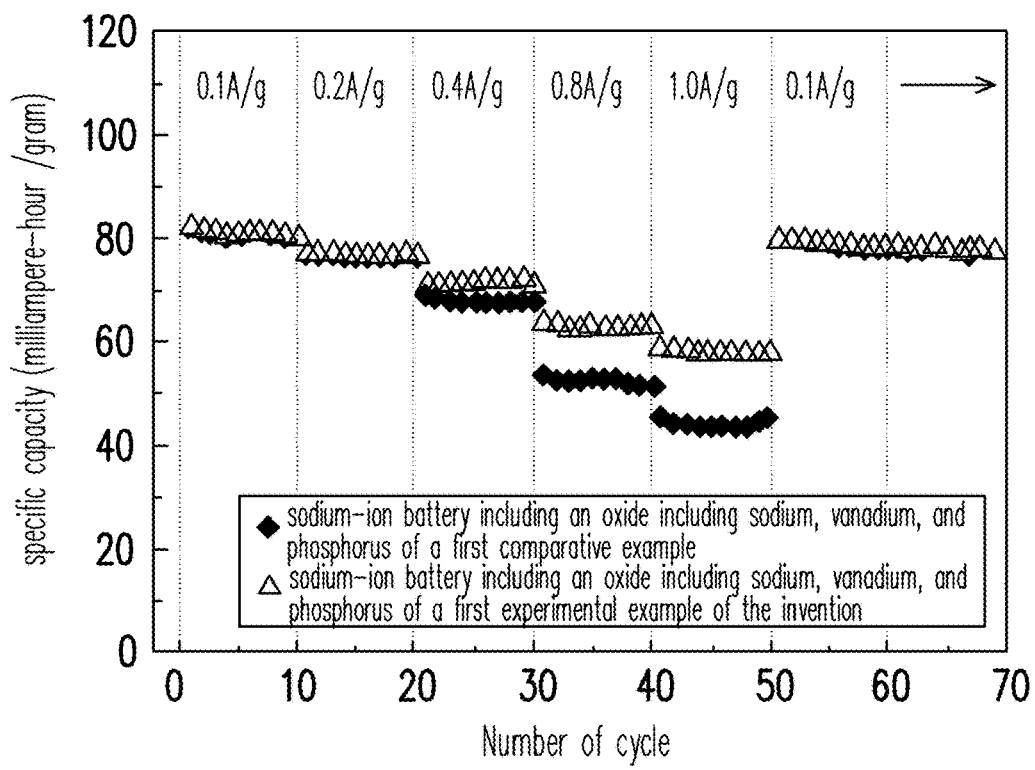
FIG. 4 is a curve graph illustrating charging rates of the sodium-ion batteries respectively including the oxide including sodium, vanadium, and phosphorus of the first experimental example and the oxide including sodium, vanadium, and phosphorus of the first comparative example of the invention.

FIG. 4 is a curve graph illustrating charging rates of the sodium-ion batteries respectively including the oxide including sodium, vanadium, and phosphorus of the first experimental example and the oxide including sodium, vanadium, and phosphorus of the first comparative example of the invention.

With reference to FIG. 4, FIG. 4 illustrates the specific capacities of the sodium-ion battery including the oxide including sodium, vanadium, and phosphorus of the first experimental example and the sodium-ion battery including the oxide including sodium, vanadium, and phosphorus of the first comparative example in different current densities. It can be seen in FIG. 4 that when the current densities are respectively be 0.1 A/g, 0.2 A/g, 0.4 A/g, 0.8 A/g, and 1.0 A/g in the same number of cycle of the batteries, the specific capacity of the sodium-ion battery including the oxide including sodium, vanadium, and phosphorus of the first experimental example is greater than the sodium-ion battery including the oxide including sodium, vanadium, and phosphorus of the first comparative example. For instance, when the current density is 1.0 A/g, the specific capacity of the sodium-ion battery including the oxide including sodium, vanadium, and phosphorus of the first experimental example is approximately 20 mAh/g higher than the specific capacity of the sodium-ion battery including the oxide including sodium, vanadium, and phosphorus of the first comparative example. In addition, with reference to FIG. 4, when the number of cycle of the battery reaches 50 and the current density changes from 1.0 A/g to 0.1 A/g again (i.e., the current density at the beginning of the cycle of the battery), it can be seen that the specific capacity of the sodium-ion battery including the oxide including sodium, vanadium, and phosphorus of the first experimental example is identical to a specific capacity of the battery at the beginning of the cycle. That is, a structure of the oxide including sodium, vanadium, and phosphorus of the first experimental example is not disintegrated when the number of cycle of the battery increases.

Figure 5A:
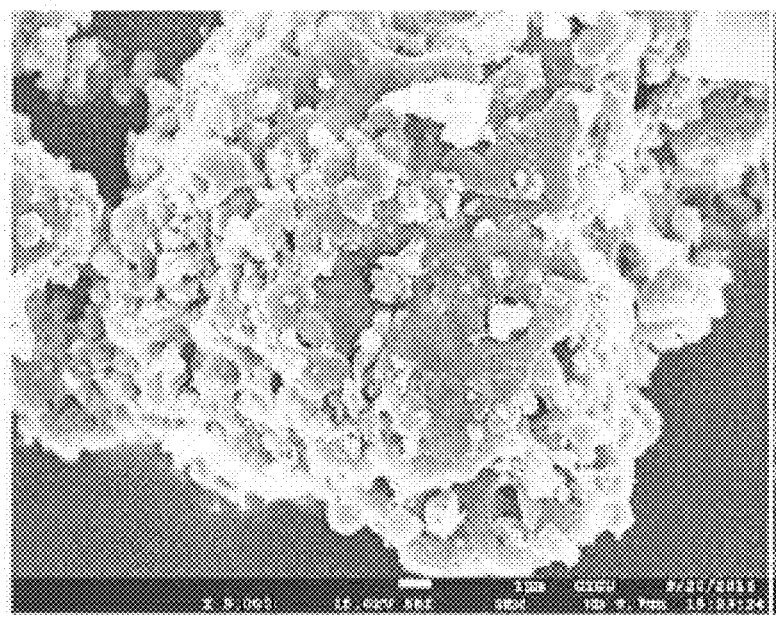
FIG. 5A is a picture taken by a scanning electron microscope illustrating the oxide including sodium, vanadium, and phosphorus of the first experimental example of the invention before being dispersed.
Figure 5B:
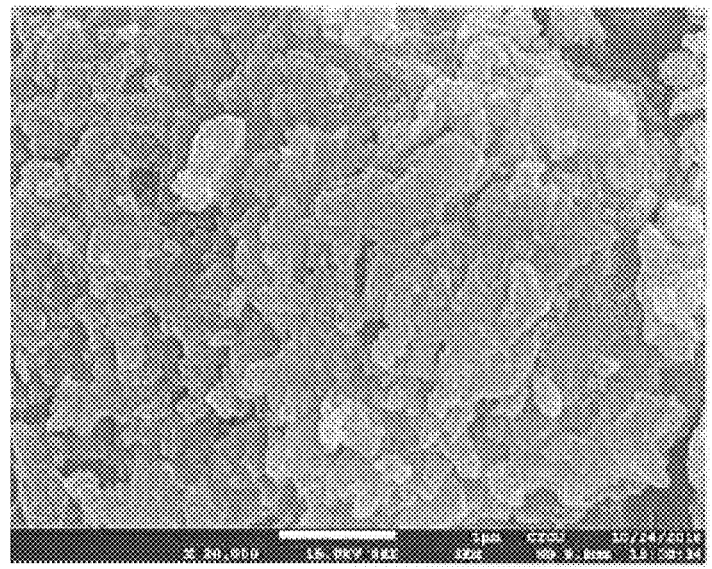
FIG. 5B is a picture taken by the scanning electron microscope illustrating the oxide including sodium, vanadium, and phosphorus of the first experimental example of the invention after being dispersed.

FIG. 5A is a picture taken by the scanning electron microscope illustrating the oxide including sodium, vanadium, and phosphorus of the first experimental example of the invention before being dispersed; FIG. 5B is a picture taken by the scanning electron microscope illustrating the oxide including sodium, vanadium, and phosphorus of the first experimental example of the invention after being dispersed.

With reference to FIG. 5A and FIG. 5B together, it can be seen that the oxide including sodium, vanadium, and phosphorus of the first experimental example is presented in an aggregated form before being dispersed, and the oxide including sodium, vanadium, and phosphorus of the first experimental example is less aggregated after being dispersed, meaning that the oxide including sodium, vanadium, and phosphorus of the first experimental example is well-dispersed. A probe ultrasound machine is used to disperse the oxide including sodium, vanadium, and phosphorus of the first experimental example, and a period of time for dispersing the oxide including sodium, vanadium, and phosphorus of the first experimental example is 1 hour.

Figure 6:
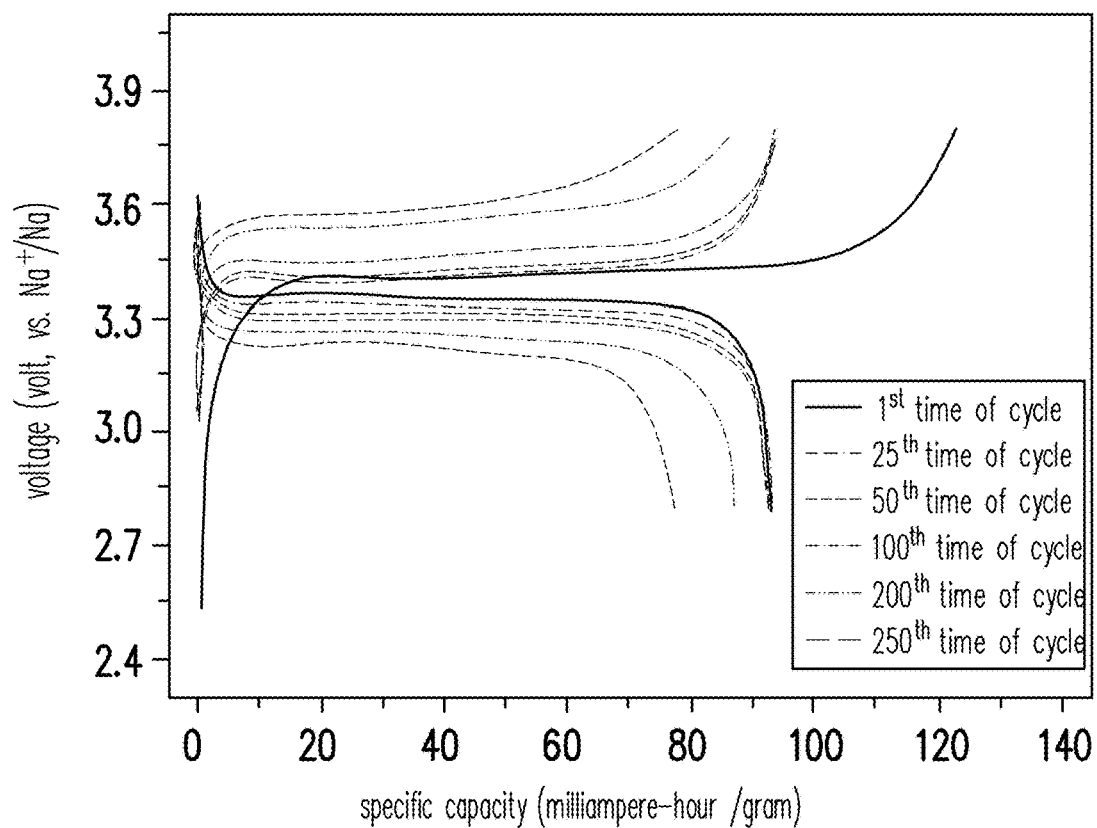
FIG. 6 is a curve graph of charging and discharging the sodium-ion battery including the oxide including sodium, vanadium, and phosphorus of the first experimental example after being dispersed.
Figure 7:
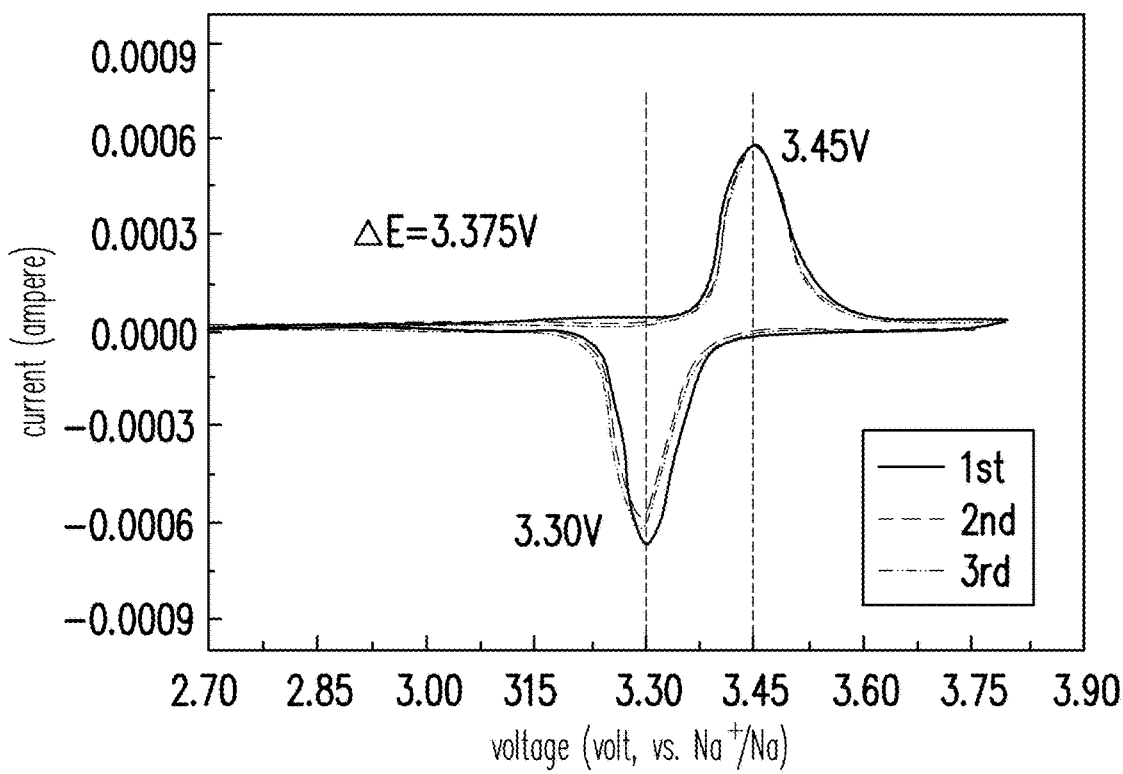
FIG. 7 is a graph of a cyclic voltagram of the sodium-ion battery including the oxide including sodium, vanadium, and phosphorus of the first experimental example after being dispersed.
Figure 8:
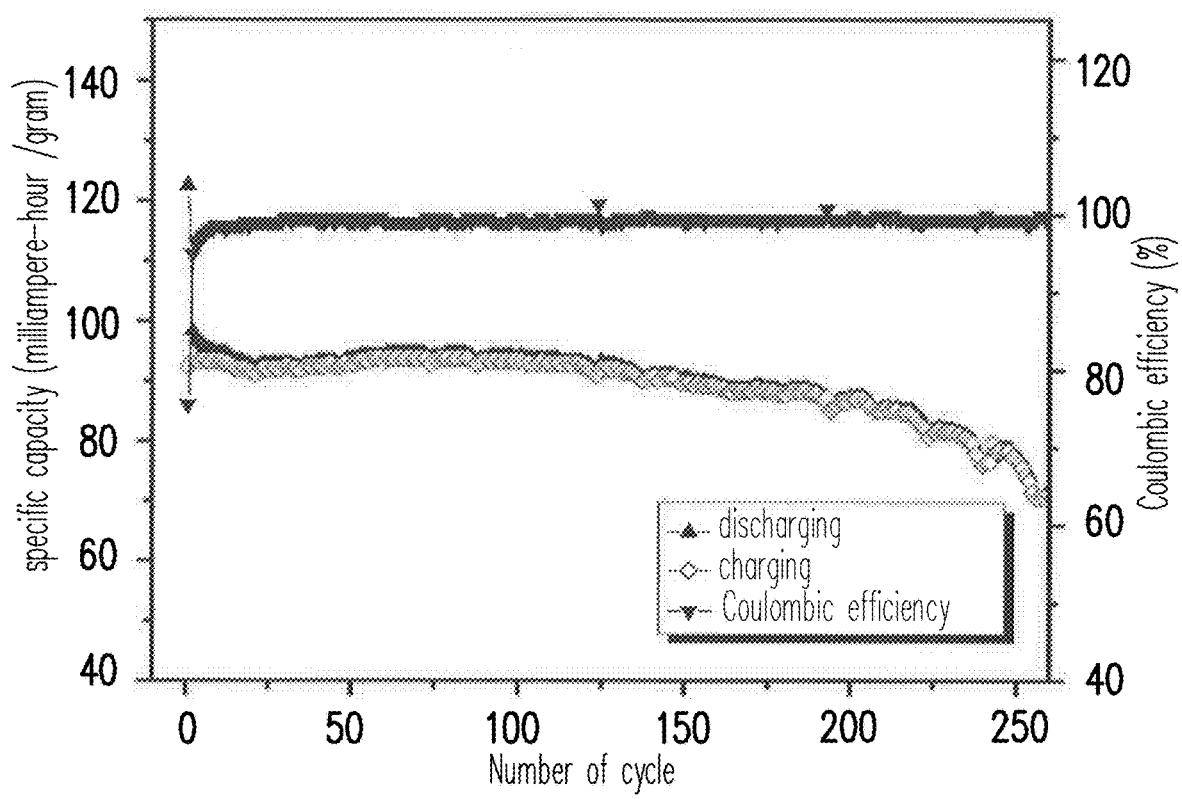
FIG. 8 is a graph of a cyclic life of the sodium-ion battery including the oxide including sodium, vanadium, and phosphorus of the first experimental example after being dispersed.
Figure 9:
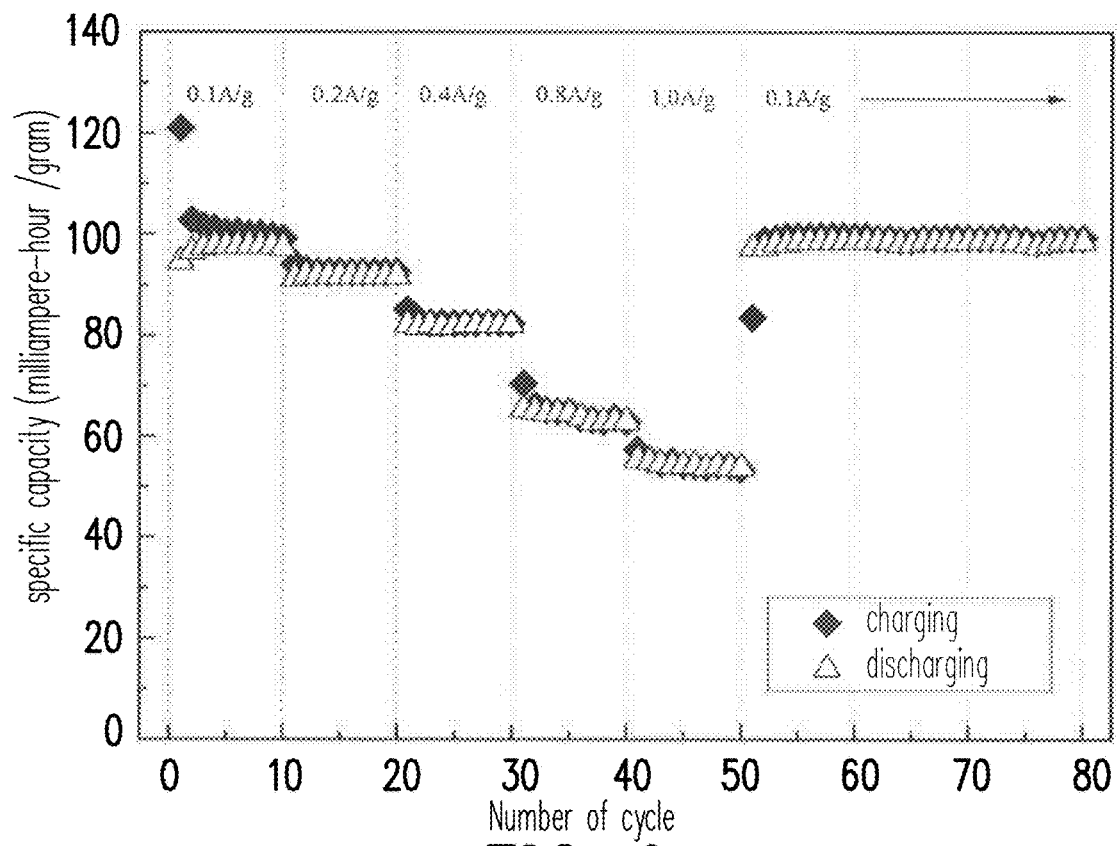
FIG. 9 is a curve graph of the charging rates of the sodium-ion battery including the oxide including sodium, vanadium, and phosphorus of the first experimental example after being dispersed.

FIG. 6 is a curve graph of charging and discharging the sodium-ion battery including the oxide including sodium, vanadium, and phosphorus of the first experimental example after being dispersed. FIG. 7 is a graph of a cyclic voltagram of the sodium-ion battery including the oxide including sodium, vanadium, and phosphorus of the first experimental example after being dispersed. FIG. 8 is a graph of a cyclic life of the sodium-ion battery including the oxide including sodium, vanadium, and phosphorus of the first experimental example after being dispersed. FIG. 9 is a curve graph of the charging rates of the sodium-ion battery including the oxide including sodium, vanadium, and phosphorus of the first experimental example after being dispersed.

It can be seen in FIG. 6 that when the current density reaches 1.0 A/g, the specific capacity of the sodium-ion battery including the oxide including sodium, vanadium, and phosphorus of the first experimental example after being dispersed does not reduce considerably after being charged and discharged for numerous times of cycle (e.g., 250 times of cycle).

FIG. 7 shows an anodic peak and a potential thereof and a cathodic peak and a potential thereof of the oxide including sodium, vanadium, and phosphorus of the first experimental example after being dispersed, wherein a scanning rate of the sodium-ion battery including the oxide including sodium, vanadium, and phosphorus of the first experimental example is 0.1 millivolt/second. An oxidation potential and a reduction potential of the oxide including sodium, vanadium, and phosphorus of the first experimental example after being dispersed are respectively be 3.45 V and 3.30 V, and an oxidation reaction of $V^{3+} \rightarrow V^{4+}$ and a reduction reaction of $V^{4+} \rightarrow V^{3+}$ can thus be respectively proved.

FIG. 8 shows that degree of decrease in the specific capacity of charging and the specific capacity of discharging the sodium-ion battery including the oxide including sodium, vanadium, and phosphorus of the first experimental example after being dispersed along with increases of the number of cycle of the battery are substantially identical. Therefore, Coulombic efficiency of the sodium-ion battery including the oxide including sodium, vanadium, and phosphorus of the first experimental example after being dispersed does not change when the number of cycle of the battery increases.

In addition, it can be seen in FIG. 9 that when the current density increases, the degree of decrease in the specific capacity of charging and the specific capacity of discharging of the sodium-ion battery including the oxide including sodium, vanadium, and phosphorus of the first experimental example after being dispersed are also identical (i.e., the Coulombic efficiency is not changed) under the same number of cycle. When the number of cycle of the battery reaches 50, the current density is changed from 1.0 A/g to 0.1 A/g (i.e., the current density at the beginning of the cycle of the battery), it can be seen that the specific capacity of charging and the specific capacity of discharging of the sodium-ion battery including the oxide including sodium, vanadium, and phosphorus of the first experimental example after being dispersed are respectively identical to the specific capacity of charging and the specific capacity of discharging of the sodium-ion battery including the oxide including sodium, vanadium, and phosphorus of the first experimental example after being dispersed at the beginning of the cycle of the battery. Meaning that a structure of the oxide including sodium, vanadium, and phosphorus of the first experimental example after being dispersed is not disintegrated when the number of cycle of the battery increases.

Figure 11:
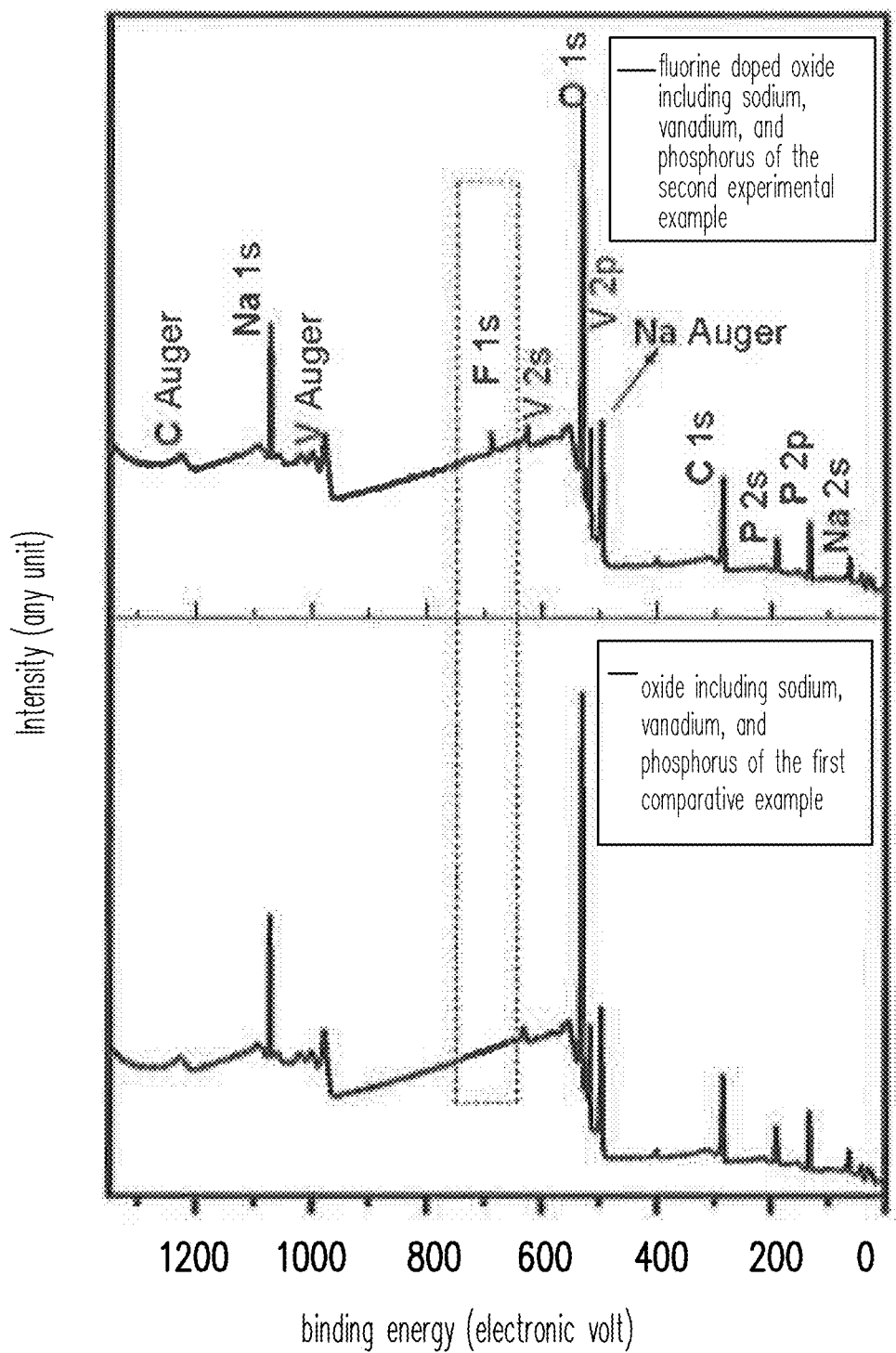
FIG. 11 are pictures of X-ray photoelectron spectroscopy illustrating the fluorine doped oxide including sodium, vanadium, and phosphorus of the second experimental example and the oxide including sodium, vanadium, and phosphorus of the first comparative example of the invention.
Figure 12A:
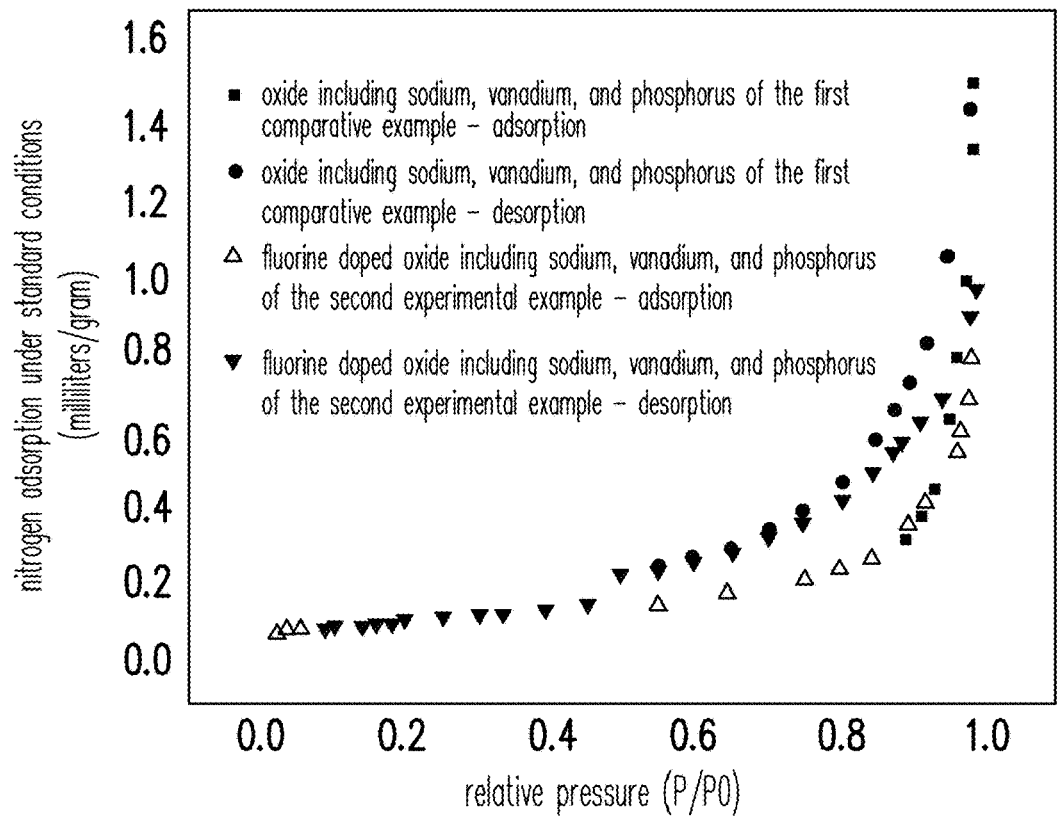
FIG. 12A is a curve graph illustrating isothermal adsorption/isothermal desorption of nitrogen of the fluorine doped oxide including sodium, vanadium, and phosphorus of the second experimental example and the oxide including sodium, vanadium, and phosphorus of the first comparative example of the invention.
Figure 12B:
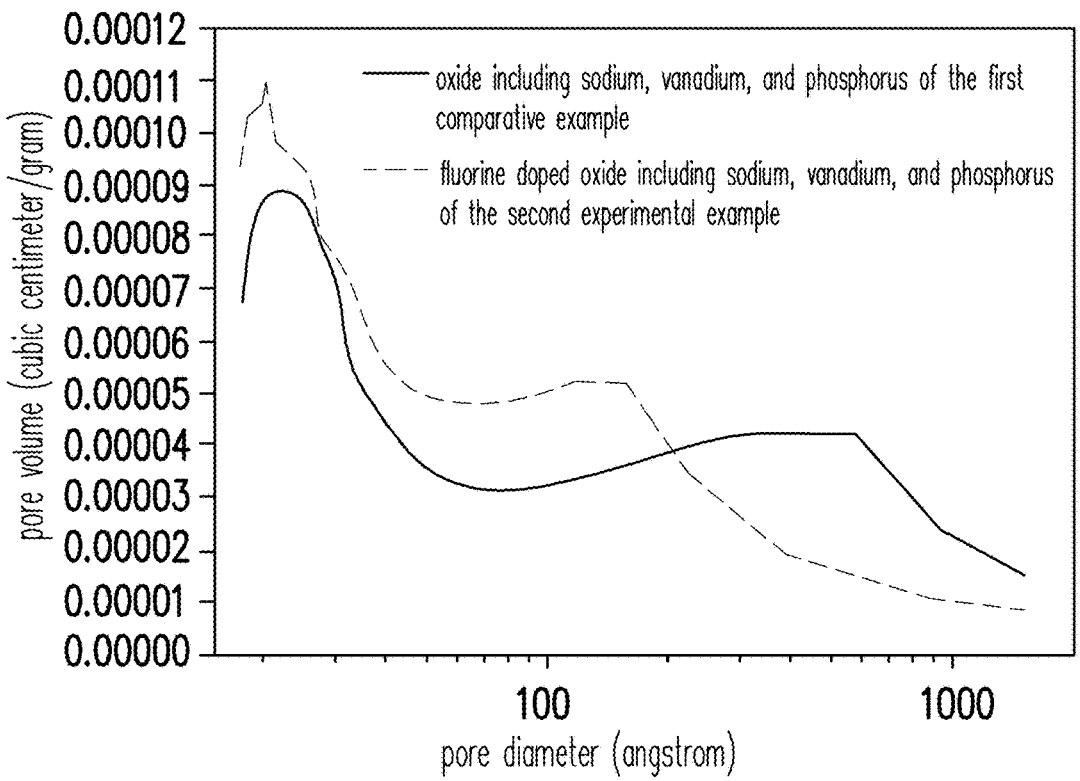
FIG. 12B is a distribution graph illustrating pore diameters of the fluorine doped oxide including sodium, vanadium, and phosphorus of the second experimental example and the oxide including sodium, vanadium, and phosphorus of the first comparative example of the invention.

FIG. 10A is a picture taken by the scanning electron microscope illustrating the oxide including sodium, vanadium, and phosphorus of the first comparative example; FIG. 10B is a picture taken by the scanning electron microscope illustrating the fluorine doped oxide including sodium, vanadium, and phosphorus of the second experimental example of the invention; FIG. 10C and FIG. 10D respectively are pictures taken by a high resolution transmission electron microscope of low magnification and high magnification illustrating the fluorine doped oxide including sodium, vanadium, and phosphorus of the second experimental example of the invention. FIG. 11 are pictures of X-ray photoelectron spectroscopy illustrating the fluorine doped oxide including sodium, vanadium, and phosphorus of the second experimental example and the oxide including sodium, vanadium, and phosphorus of the first comparative example of the invention. FIG. 12A is a curve graph illustrating isothermal adsorption/isothermal desorption of nitrogen of the fluorine doped oxide including sodium, vanadium, and phosphorus of the second experimental example and the oxide including sodium, vanadium, and phosphorus of the first comparative example of the invention; FIG. 12B is a distribution graph illustrating pore diameters of the fluorine doped oxide including sodium, vanadium, and phosphorus of the second experimental example and the oxide including sodium, vanadium, and phosphorus of the first comparative example of the invention.

The fluorine doped oxide including sodium, vanadium, and phosphorus of the second experimental example is formed by mixing, for example, sodium fluoride, sodium carbonate, ammonium vanadate, and ammonium dihydrogen phosphate acting as precursor. A manufacturing process thereof is described in detail in paragraphs provided above, and detail description is thus omitted here. In the process of forming the fluorine doped oxide including sodium, vanadium, and phosphorus of the second experimental example, the added mole ratio of sodium fluoride to sodium carbonate to ammonium vanadate to ammonium dihydrogen phosphate is 0.15:3:2:3. In addition, the fluorine doped oxide including sodium, vanadium, and phosphorus of the second experimental example is $Na_3V_2(PO_{3.85}F_{0.5})_3$.

With reference to FIG. 10A and FIG. 10B, it can be seen that a surface of the fluorine doped oxide including sodium, vanadium, and phosphorus of the second experimental example has a plurality of micropores compared to the oxide including sodium, vanadium, and phosphorus of the first comparative example. Besides, in the pictures taken by the high-resolution transmission electron microscope illustrated in FIG. 10C and FIG. 10D, it can evidently be seen that the plurality of micropores of the fluorine doped oxide including sodium, vanadium, and phosphorus of the second experimental example can contribute to diffusion of ions in electrolyte and has a larger surface area in contact with the electrolyte.

The pictures of the X-ray photoelectron spectroscopy of FIG. 11 shows that the fluorine doped oxide including sodium, vanadium, and phosphorus of the second experimental example is indeed doped with fluorine.

In FIG. 12A and FIG. 12B, the fluorine doped oxide including sodium, vanadium, and phosphorus of the second experimental example has a relatively less average pore diameter and a greater surface area compared to the oxide including sodium, vanadium, and phosphorus of the first comparative example.

Figure 13:
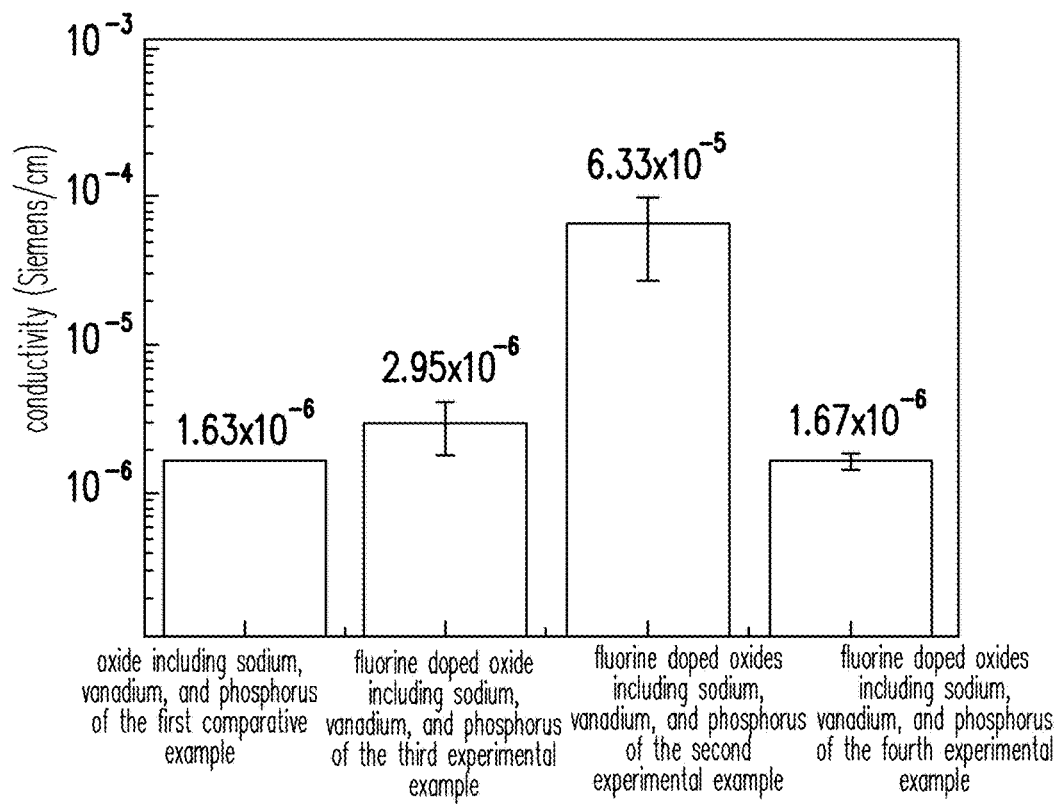
FIG. 13 is a bar graph illustrating conductivities of the fluorine doped oxides including sodium, vanadium, and phosphorus of the second experimental example, the third experimental example, and the fourth experimental example and the oxide including sodium, vanadium, and phosphorus of the first comparative example of the invention.

FIG. 13 is a bar graph illustrating conductivities of the fluorine doped oxides including sodium, vanadium, and phosphorus of the second experimental example, the third experimental example, and the fourth experimental example and the oxide including sodium, vanadium, and phosphorus of the first comparative example of the invention.

The fluorine doped oxide including sodium, vanadium, and phosphorus of the third experimental example and the fluorine doped oxide including sodium, vanadium, and phosphorus of the fourth experimental example are formed by mixing, for example, sodium fluoride, sodium carbonate, ammonium vanadate, and ammonium dihydrogen phosphate acting as the precursor. A manufacturing process thereof is described in detail in paragraphs provided above, and detail description is thus omitted here. In the process of forming the fluorine doped oxide including sodium, vanadium, and phosphorus of the third experimental example, the added mole ratio of sodium fluoride to sodium carbonate to ammonium vanadate to ammonium dihydrogen phosphate is 0.10:3:2:3. Further, the fluorine doped oxide including sodium, vanadium, and phosphorus is $Na_3V_2(PO_{3.9}F_{0.1})_3$. In the process of forming the fluorine doped oxide including sodium, vanadium, and phosphorus of the fourth experimental example, the added mole ratio of sodium fluoride to sodium carbonate to ammonium vanadate to ammonium dihydrogen phosphate is 0.30:3:2:3. Further, the fluorine doped oxide including sodium, vanadium, and phosphorus is $Na_3V_2(PO_{3.7}F_{0.3})_3$.

In FIG. 13, it can be seen that the conductivities of the fluorine doped oxides including sodium, vanadium, and phosphorus of the second experimental example, the third experimental example, and the fourth experimental example are all greater than the conductivity of the oxide including sodium, vanadium, and phosphorus of the first comparative example. In other words, when the oxide including sodium, vanadium, and phosphorus is doped with fluorine, the conductivity of the oxide including sodium, vanadium, and phosphorus increases, and the fluorine doped oxide including sodium, vanadium, and phosphorus of the second experimental example has the greatest conductivity.

Figure 14:
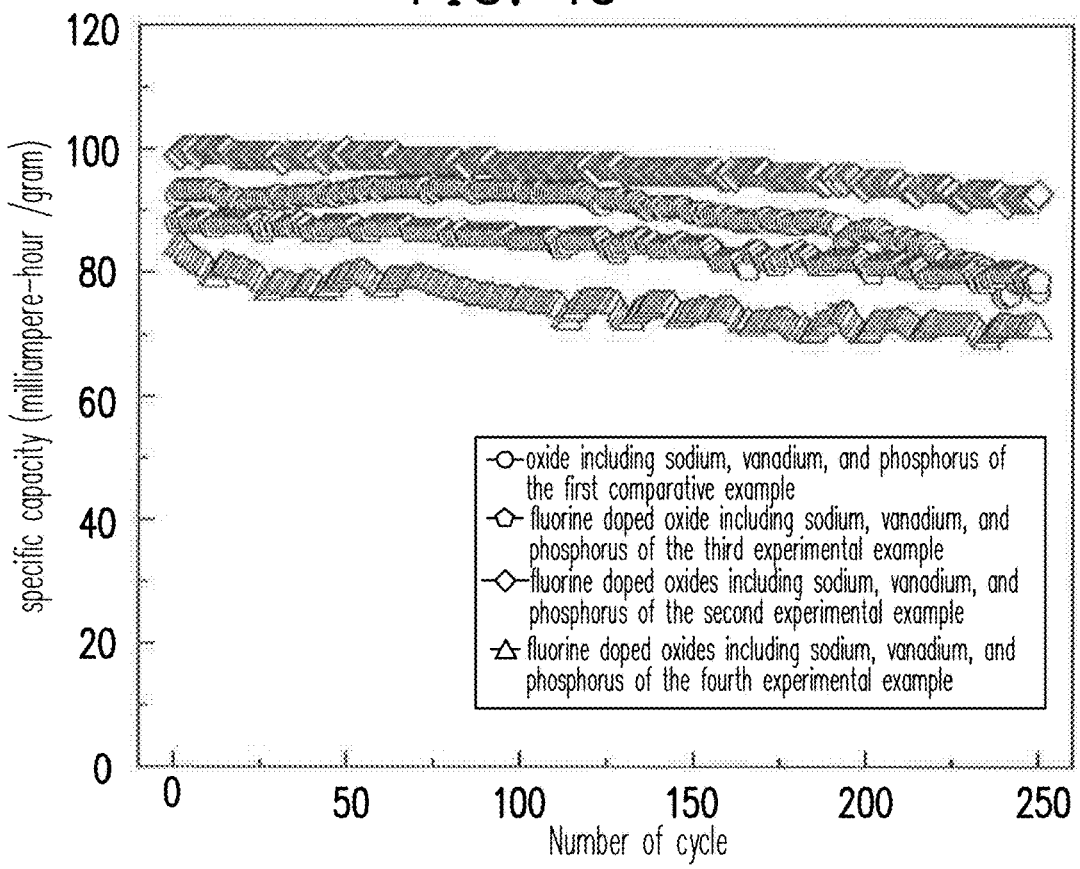
FIG. 14 is a graph of the cyclic lives of the sodium-ion batteries respectively including the fluorine doped oxides including sodium, vanadium, and phosphorus of the second experimental example, the third experimental example, and the fourth experimental example and the oxide including sodium, vanadium, and phosphorus of the first comparative example of the invention.

FIG. 14 is a graph of the cyclic lives of the sodium-ion batteries respectively including the fluorine doped oxides including sodium, vanadium, and phosphorus of the second experimental example, the third experimental example, and the fourth experimental example and the oxide including sodium, vanadium, and phosphorus of the first comparative example of the invention.

FIG. 14 shows that the specific capacities of the sodium-ion batteries respectively including the fluorine doped oxides including sodium, vanadium, and phosphorus of the second experimental example and the third experimental example are both greater than the specific capacity of the sodium-ion battery including the oxide including sodium, vanadium, and phosphorus of the first comparative example in the same number of cycle of the batteries (wherein the current density is 1 ampere/gram).

Figure 15:
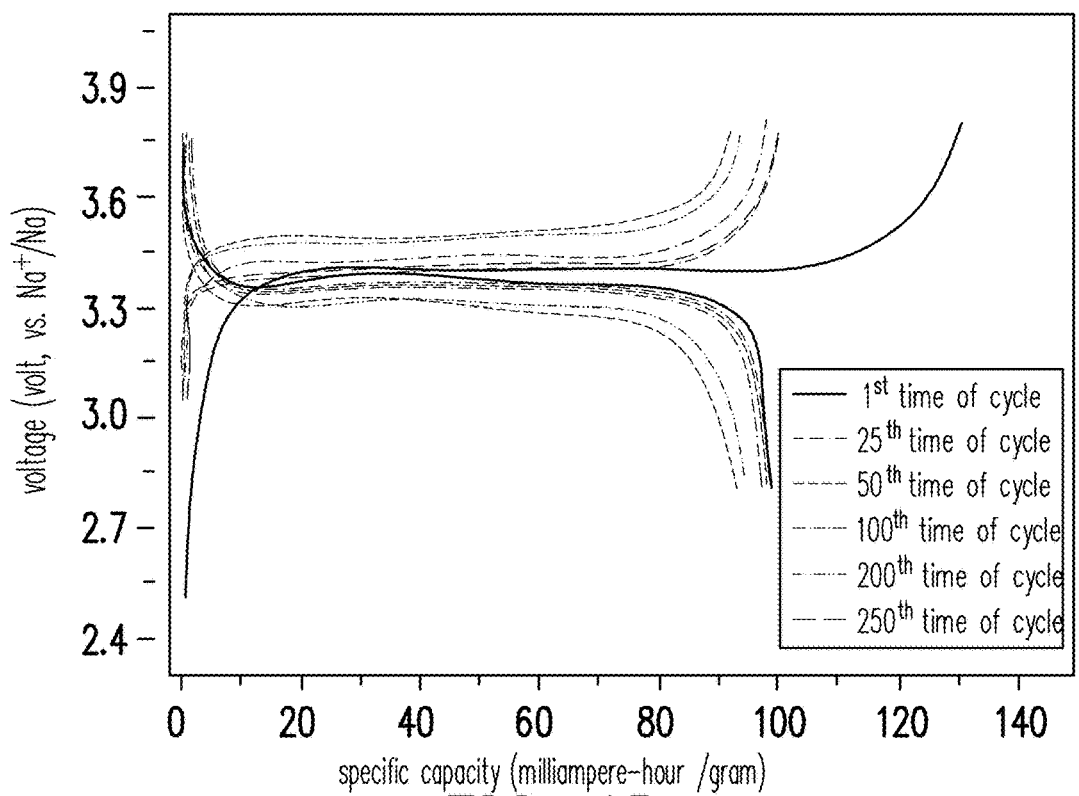
FIG. 15 is a curve graph of charging and discharging the sodium-ion battery including the fluorine doped oxide including sodium, vanadium, and phosphorus of the second experimental example of the invention.

FIG. 15 is a curve graph of charging and discharging the sodium-ion battery including the fluorine doped oxide including sodium, vanadium, and phosphorus of the second experimental example of the invention.

It can be seen in FIG. 15 that the specific capacity of the sodium-ion battery including the oxide including sodium, vanadium, and phosphorus of the second experimental example does not reduce considerably after being discharged (wherein the current density is 1 ampere/gram) for numerous times of cycle. That is, when the sodium-ion battery includes the fluorine doped oxide including sodium, vanadium, and phosphorus, an aging rate of the battery can be decreased.

Figure 16:
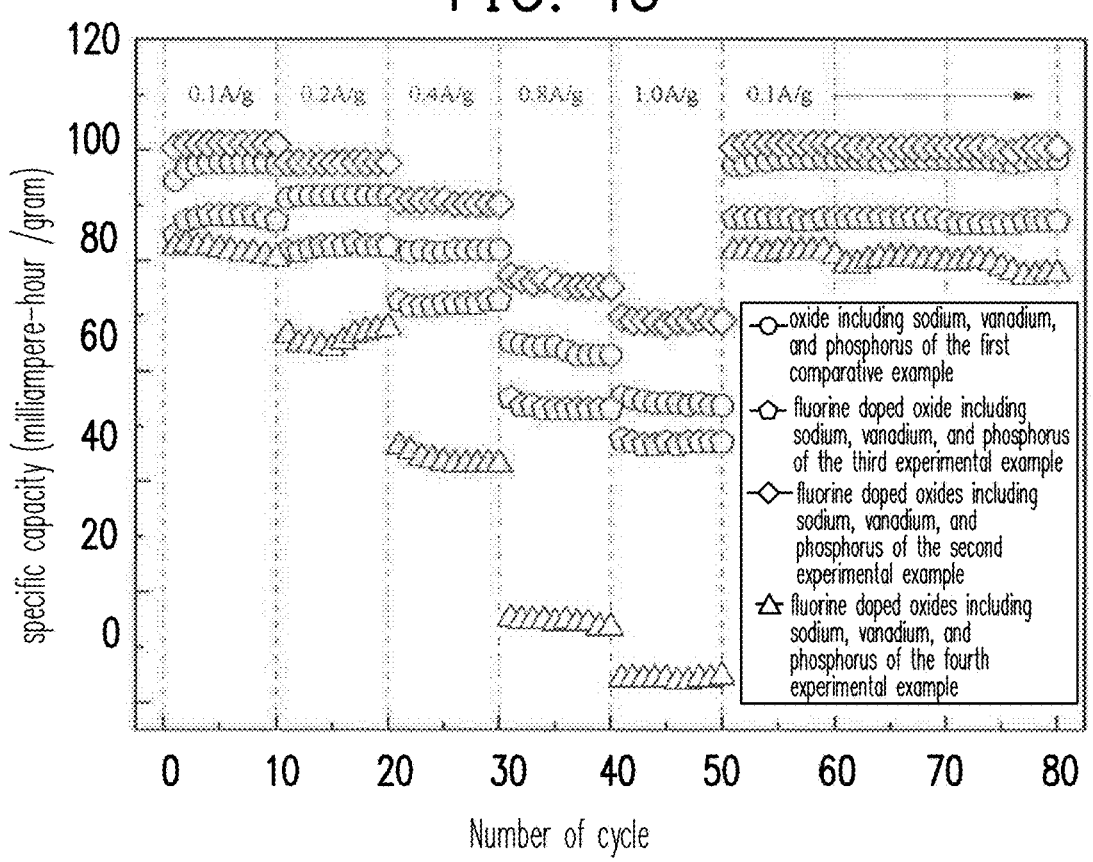
FIG. 16 is a curve graph illustrating charging rates of the sodium-ion batteries respectively including the fluorine doped oxides including sodium, vanadium, and phosphorus of the second experimental example, the third experimental example, and the fourth experimental example and the oxide including sodium, vanadium, and phosphorus of the first comparative example of the invention.

FIG. 16 is a curve graph illustrating charging rates of the sodium-ion batteries respectively including the fluorine doped oxides including sodium, vanadium, and phosphorus of the second experimental example, the third experimental example, and the fourth experimental example and the oxide including sodium, vanadium, and phosphorus of the first comparative example of the invention.

FIG. 16 illustrates the specific capacities of the sodium-ion batteries respectively including the fluorine doped oxides including sodium, vanadium, and phosphorus of the second experimental example, the third experimental example, and the fourth experimental example and the oxide including sodium, vanadium, and phosphorus of the first comparative example at different current densities. When the current density is 0.1 A/g, the specific capacity of the sodium-ion battery including the oxide including sodium, vanadium, and phosphorus of the second experimental example is the greatest in the same number of cycle of the batteries. When the current density sequentially increases, the specific capacity of the sodium-ion battery including the oxide including sodium, vanadium, and phosphorus of the second experimental example shows the least decrease in specific capacity. That is, when the sodium-ion battery includes the oxide including sodium, vanadium, and phosphorus of the second experimental example, the aging rate of the battery can be decreased. In addition, with reference to FIG. 16, when the current density changes from 1.0 A/g to 0.1 A/g (i.e., the current density at the beginning of the cycle of the battery), it can be seen that the specific capacities of the sodium-ion batteries including the fluorine doped oxides including sodium, vanadium, and phosphorus of the second experimental example, the third experimental example, and the fourth experimental example are identical to the specific capacity of the sodium-ion battery at the beginning of the cycle. That is, the structures of the fluorine doped oxides including sodium, vanadium, and phosphorus of the second experimental example, the third experimental example, and the fourth experimental example are not disintegrated when the number of cycle of the battery increases.

Figure 17:
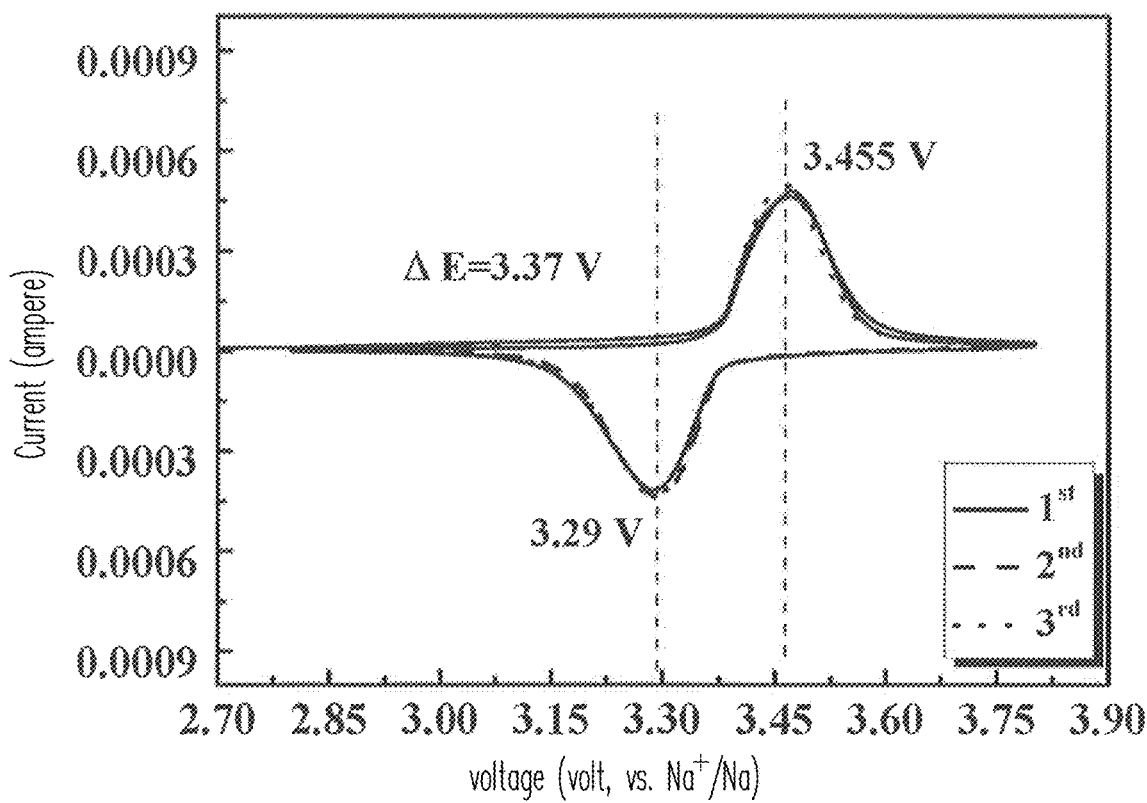
FIG. 17 is a graph of the cyclic voltagram of the sodium-ion battery including the fluorine doped oxide including sodium, vanadium, and phosphorus of the second experimental example of the invention.

FIG. 17 is a graph of the cyclic voltagram of the sodium-ion battery including the fluorine doped oxide including sodium, vanadium, and phosphorus of the second experimental example of the invention.

FIG. 17 shows an anodic peak and a potential thereof and a cathodic peak and a potential thereof of the fluorine doped oxide including sodium, vanadium, and phosphorus of the second experimental example, wherein a scanning rate of the sodium-ion battery including the fluorine doped oxide including sodium, vanadium, and phosphorus of the second experimental example is 0.1 millivolt/second. The oxidation potential and the reduction potential of the fluorine doped oxide including sodium, vanadium, and phosphorus of the second experimental example are respectively be 3.455 V and 3.29V, and the oxidation reaction of $V^{3+} \rightarrow V^{4+}$ and the reduction reaction of $V^{4+} \rightarrow V^{3+}$ can thus be respectively proved.

Figure 18:
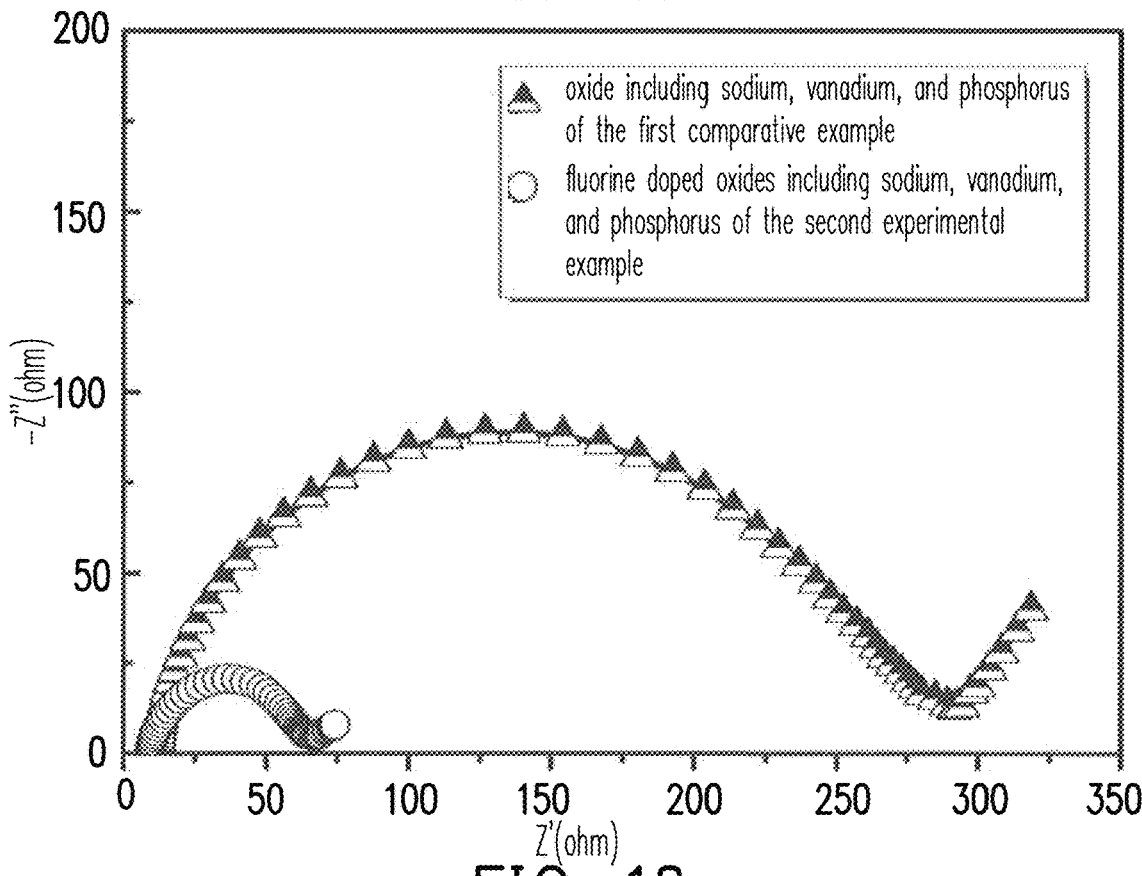
FIG. 18 is an alternating current impedance graph of the sodium-ion batteries respectively including the fluorine doped oxide including sodium, vanadium, and phosphorus of the second experimental example and the oxide including sodium, vanadium, and phosphorus of the first comparative example of the invention.

FIG. 18 is an alternating current pedance graph of the sodium-ion batteries respectively including the fluorine doped oxide including sodium, vanadium, and phosphorus of the second experimental example and the oxide including sodium, vanadium, and phosphorus of the first comparative example of the invention.

In FIG. 18, it can be seen that the impedance of the sodium-ion battery including the fluorine doped oxide including sodium, vanadium, and phosphorus of the second experimental example is considerably less than the impedance of the sodium-ion battery including the oxide including sodium, vanadium, and phosphorus of the first comparative example. That is, when the sodium-ion battery includes the fluorine doped oxide including sodium, vanadium, and phosphorus, electric properties of the sodium-ion battery increases.

Figure 19:
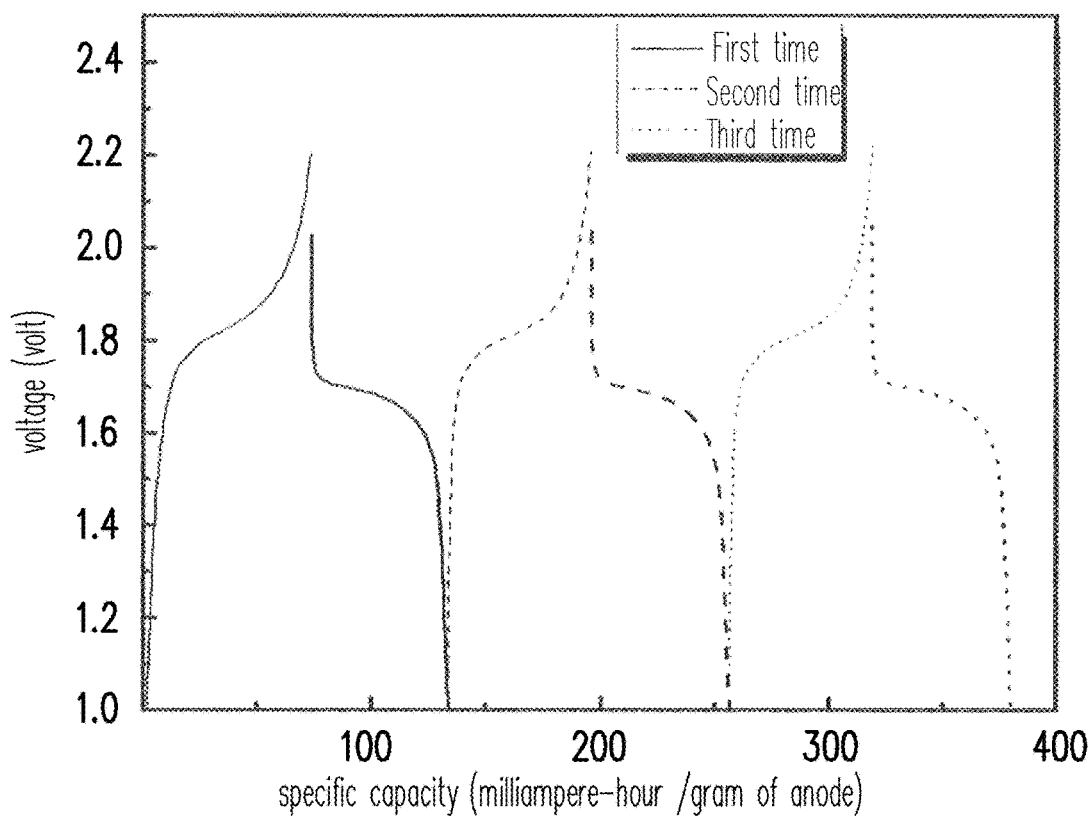
FIG. 19 is a curve graph of charging and discharging the sodium-ion full battery, wherein the anode and the cathode of the sodium-ion full battery respectively includes the fluorine doped oxide including sodium, vanadium, and phosphorus of the second experimental example of the invention.
Figure 20:
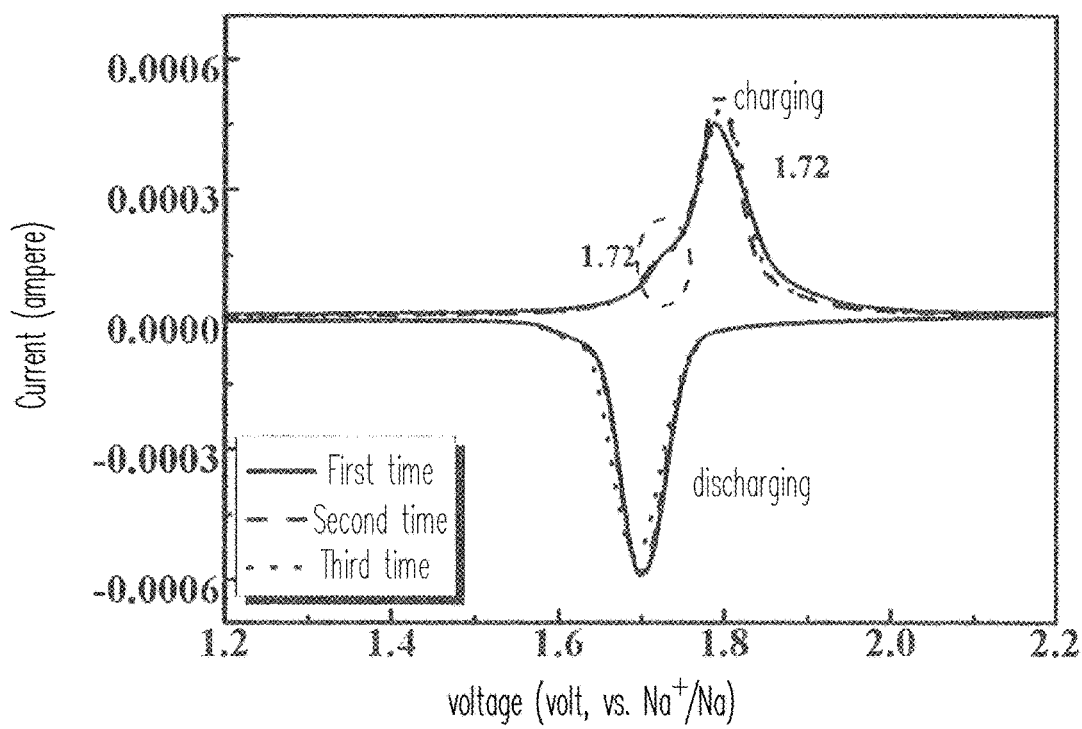
FIG. 20 is a graph of the cyclic voltagram of the sodium-ion full battery, wherein the anode and the cathode of the sodium-ion full battery respectively includes the fluorine doped oxide including sodium, vanadium, and phosphorus of the second experimental example of the invention.
Figure 21:
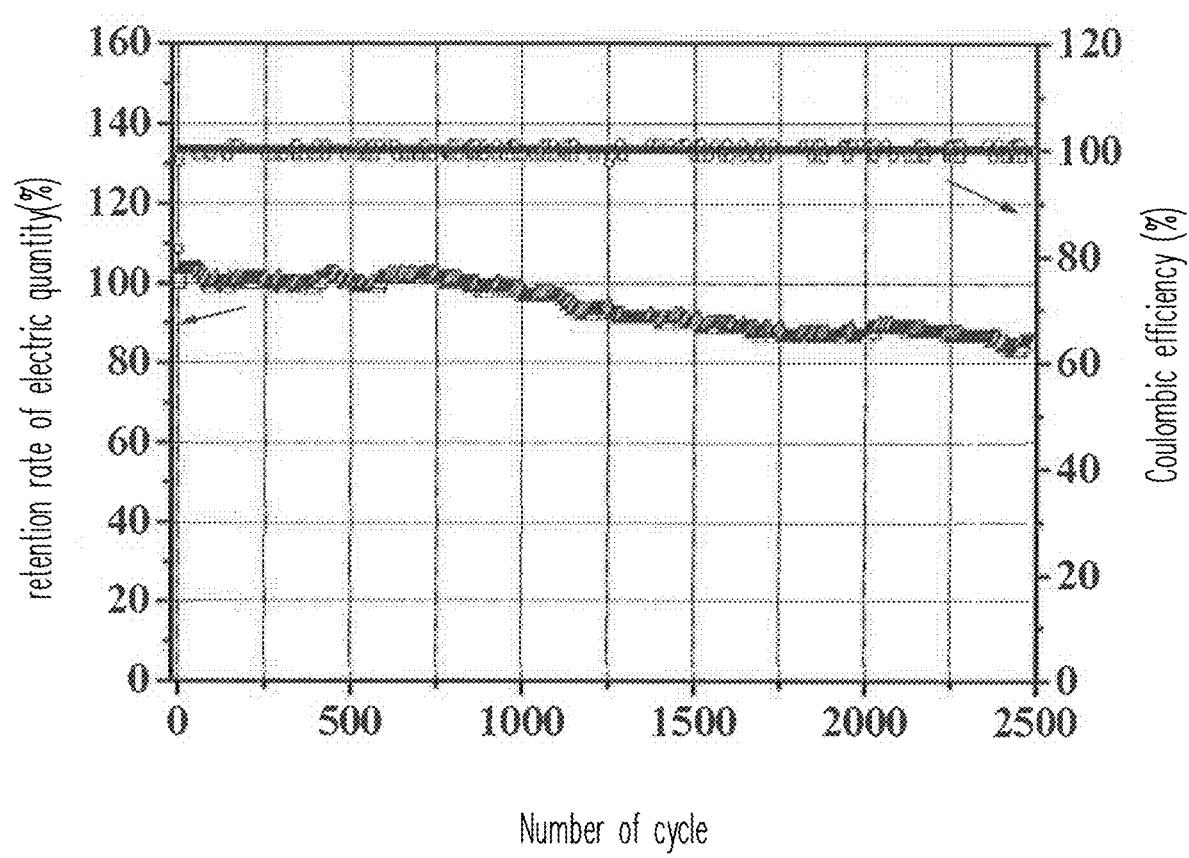
FIG. 21 is a curve graph illustrating changes of a retention rate of electric quantity and the Coulombic efficiency of the sodium-ion full battery along with changes of the numbers of cycle, wherein the anode and the cathode of the sodium-ion full battery respectively includes the fluorine doped oxide including sodium, vanadium, and phosphorus of the second experimental example of the invention.

FIG. 19 is a curve graph of charging and discharging the sodium-ion full battery, wherein the anode and the cathode of the sodium-ion full battery respectively includes the fluorine doped oxide including sodium, vanadium, and phosphorus of the second experimental example of the invention. FIG. 20 is a graph of the cyclic voltagram of the sodium-ion full battery, wherein the anode and the cathode of the sodium-ion full battery respectively includes the fluorine doped oxide including sodium, vanadium, and phosphorus of the second experimental example of the invention. FIG. 21 is a curve graph illustrating changes of a retention rate of electric quantity and the Coulombic efficiency of the sodium-ion full battery along with changes of the numbers of cycle, wherein the anode and the cathode of the sodium-ion full battery respectively includes the fluorine doped oxide including sodium, vanadium, and phosphorus of the second experimental example of the invention.

In this embodiment, the electrodes of the sodium-ion full battery (the anode and/or the cathode) include the fluorine doped oxide including sodium, vanadium, and phosphorus of the second experimental example, the adhesion promoter, the conducting agent, and the solvent. The adhesion promoter adopts polyvinylidene difluoride (PVDF). The conducting agent adopts Super-P carbon black. The solvent adopts N-methyl-2-pyrrolidone.

With reference to FIG. 19 and FIG. 20, the specific capacities (wherein the current density is 1 ampere/gram) of the sodium-ion full battery with the fluorine doped oxide including sodium, vanadium, and phosphorus of the second experimental example respectively acting as the anode and the cathode during charging and discharging and the anodic peak and the potential thereof and the cathodic peak and the potential thereof of the fluorine doped oxide including sodium, vanadium, and phosphorus of the second experimental example are depicted. Here, a scanning rate and a potential window range of the sodium-ion full battery including the fluorine doped oxide including sodium, vanadium, and phosphorus of the second experimental example respectively are 0.1 millivolt/second and 1.0 volt to 2.2 volts. The oxidation potential and the reduction potential of the fluorine doped oxide including sodium, vanadium, and phosphorus of the second experimental example are respectively be 1.8V and 1.7V, and the oxidation reaction of $V^{3+} \rightarrow V^{4+}$ and the reduction reaction of $V^{4+} \rightarrow V^{3+}$ can thus be respectively proved.

FIG. 21 illustrates that the specific capacity of charging and the specific capacity of discharging (wherein the current density is 1 ampere/gram) of the sodium-ion full battery respectively including the fluorine doped oxide including sodium, vanadium, and phosphorus of the second experimental example acting as the anode and the cathode start to decrease gradually only when the number of cycle of the battery reaches as high as 1000. Further, ranges of decreases in specific capacities during charging and discharging are substantially identical. Therefore, the Coulombic efficiency of the sodium-ion battery including the oxide including sodium, vanadium, and phosphorus of the second experimental example is not reduced considerably when the number of cycle of the battery increases. In addition, the retention rate of electric quantity of the sodium-ion full battery still reaches 90% when the number of cycle of the battery arrives at 2500. That is, when the anode and the cathode of the sodium-ion full battery include the fluorine doped oxide including sodium, vanadium, and phosphorus of the second experimental example, the aging rate of the battery can be decreased.

In view of the foregoing, in the embodiments, when the oxide including sodium, vanadium, and phosphorus formed by changing added amount of sodium salt or performing fluorine doping acts as the electrode material of the sodium-ion battery, the electrodes of the sodium-ion battery are not disintegrated as affected by increasing number of cycle of the battery. Moreover, the retention rate of electric quantity is still maintained at a high level after numerous times of cycles of the battery are performed. As such, the sodium-ion battery is equipped with favorable cyclic life. In addition, the sodium-ion battery including the oxide including sodium, vanadium, and phosphorus of the embodiments also has increased specific capacity and decreased impedance. Further, in the manufacturing method of the oxide including sodium, vanadium, and phosphorus of the embodiments, the aggregated powder containing the oxide including sodium, vanadium, and phosphorus is dispersed. The oxide including sodium, vanadium, and phosphorus formed by sintering is thus not aggregated. Therefore, the electric properties of the sodium-ion battery with the oxide including sodium, vanadium, and phosphorus acting as the electrode material increase as well.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electrode material of a sodium-ion battery, the electrode material of the sodium-ion battery comprises a fluorine doped oxide comprising sodium, vanadium, and phosphorus represented by formula 2:

$$Na_{3+x2-y}V_2(PO_{4-y}F_y)_3, \quad \text{[formula 2]}$$

wherein $0.01 \leq x2 \leq 0.99$ and $0.01 \leq y \leq 0.30$.

2. The electrode material of the sodium-ion battery as claimed in claim 1, wherein x2 is 0.25, and y is 0.15.

3. An electrode of a sodium-ion battery, comprising:
a fluorine doped oxide comprising sodium, vanadium, and phosphorus represented by formula 2:

$$Na_{3+x2-y}V_2(PO_{4-y}F_y)_3, \quad \text{[formula 2]}$$

wherein $0.01 \leq x2 \leq 0.99$ and $0.01 \leq y \leq 0.30$;
an adhesion promoter;
a conducting agent; and
a solvent.

* * * * *